US012789097B2

(12) United States Patent
Yong

(10) Patent No.: US 12,789,097 B2

(45) Date of Patent: Nov. 10, 2026

(54) METHOD FOR CHANGING SKIN OF VIRTUAL ITEM, AND NON-TRANSITORY STORAGE MEDIUM AND ELECTRONIC DEVICE THEREOF

(71) Applicant: NETEASE (HANGZHOU) NETWORK CO., LTD., Hangzhou (CN)

(72) Inventor: Wentong Yong, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 212 days.

(21) Appl. No.: 18/701,631

(22) PCT Filed: Sep. 21, 2022

(86) PCT No.: PCT/CN2022/120206

§ 371 (c)(1),
(2) Date: Apr. 16, 2024

(87) PCT Pub. No.: WO2023/201985

PCT Pub. Date: Oct. 26, 2023

(65) Prior Publication Data

US 2025/0229182 A1 Jul. 17, 2025

(30) Foreign Application Priority Data

Apr. 20, 2022 (CN) ......................... 202210420432.2

(51) Int. Cl.
*A63F 13/63* (2014.01)
*A63F 13/2145* (2014.01)
(Continued)

(52) U.S. Cl.
CPC .......... *A63F 13/63* (2014.09); *A63F 13/2145* (2014.09); *A63F 13/53* (2014.09);
(Continued)

(58) Field of Classification Search
CPC .......... A63F 13/53; A63F 13/63; A63F 13/77; A63F 13/2145; A63F 13/52; A63F 13/69;
(Continued)

(56) References Cited

U.S. PATENT DOCUMENTS 8,832,552 B2 * 9/2014 Arrasvuori ............. G06Q 10/10
715/706
9,064,279 B1 * 6/2015 Tuan .................. G06Q 30/0627
(Continued)

FOREIGN PATENT DOCUMENTS

CN 102129368 A 7/2011
CN 109603151 A 4/2019
(Continued)

OTHER PUBLICATIONS

1st Office Action dated May 16, 2025 of Chinese Application No. 2022104204322.
(Continued)

*Primary Examiner* — Xuan M Thai
*Assistant Examiner* — Shauna-Kay Hall
(74) *Attorney, Agent, or Firm* — Qinghong Xu

(57) ABSTRACT

A method for changing a skin of a virtual item, a non-transitory storage medium and an electronic device are disclosed. The method includes: in response to a skin-changing touch operation for a target part, displaying a skin control of a first to-be-selected skin corresponding to the target part, wherein the virtual item includes a plurality of parts and the target part is one of the plurality of parts, a graphical user interface is provided by a terminal device, and content displayed by the graphical user interface includes the virtual item; and in response to a first selection touch operation for a target skin control of a target skin in the skin control, changing a current skin of the target part into the target skin.

9 Claims, 5 Drawing Sheets

(51) Int. Cl.
*A63F 13/53* (2014.01)
*A63F 13/79* (2014.01)
*A63F 13/92* (2014.01)

(52) U.S. Cl.
CPC .............. *A63F 13/79* (2014.09); *A63F 13/92* (2014.09); *A63F 2300/308* (2013.01)

(58) Field of Classification Search
CPC .... A63F 13/79; A63F 13/92; A63F 2300/308; G06F 3/048042; G06F 3/048045; G06F 9/451
See application file for complete search history.

(56) References Cited

U.S. PATENT DOCUMENTS

| | | | | |
|---|---|---|---|---|
| 9,442,973 | B1 * | 9/2016 | Tuan | G06F 16/9535 |
| 10,118,099 | B2 * | 11/2018 | Condrey | A63F 13/60 |
| 11,093,733 | B2 * | 8/2021 | Yuan | G06V 40/167 |
| 2007/0066403 | A1 * | 3/2007 | Conkwright | A63F 13/803 463/43 |
| 2009/0075709 | A1 * | 3/2009 | Park | A63F 13/837 463/2 |
| 2009/0299960 | A1 * | 12/2009 | Lineberger | A63F 13/60 |
| 2012/0246572 | A1 * | 9/2012 | Tu | H04L 67/34 715/747 |
| 2015/0026016 | A1 * | 1/2015 | DeVeaux | G06Q 30/0643 705/27.2 |
| 2015/0057084 | A1 * | 2/2015 | Lin | A63F 13/352 463/42 |
| 2015/0258440 | A1 * | 9/2015 | Zhang | A63F 13/25 463/31 |
| 2016/0012640 | A1 * | 1/2016 | Abraham | A63F 13/655 345/420 |
| 2016/0166935 | A1 * | 6/2016 | Condrey | A63F 13/48 463/31 |
| 2017/0368461 | A1 * | 12/2017 | Ceraldi | A63F 13/525 |
| 2021/0197089 | A1 * | 7/2021 | Wang | A63F 13/847 |
| 2021/0387093 | A1 * | 12/2021 | Linden | A63F 13/60 |
| 2022/0226727 | A1 * | 7/2022 | Yao | A63F 13/57 |
| 2022/0288491 | A1 * | 9/2022 | Xiao | A63F 13/822 |
| 2023/0037089 | A1 * | 2/2023 | Deng | G06T 19/20 |
| 2024/0131429 | A1 * | 4/2024 | Wang | A63F 13/52 |

FOREIGN PATENT DOCUMENTS

| | | | |
|---|---|---|---|
| CN | 110772787 | A | 2/2020 |
| CN | 112138393 | A | 12/2020 |
| CN | 112791397 | A | 5/2021 |
| CN | 114748876 | A | 7/2022 |
| JP | 2021100470 | A | 7/2021 |
| JP | 2021533858 | A | 12/2021 |
| WO | 2020134059 | A1 | 7/2020 |

OTHER PUBLICATIONS

Where to enter the weapons workshop of cf mobile? Weapons workshop location and custom weapons analysis, https://www.shouji.com.cn/news/g36981.html, published on Sep. 22, 2020.

Escape from Tarkov's Full Assault Rifle Modifications and Strength Analysis [Multi Image], https://www.jiaochengzhijia.com/game/pcgame/59061.html, published on Feb. 26, 2021.

1st Office Action dated Dec. 24, 2024 of Japanese Application No. 2023-574194.

[BF2042] How to customize weapons and change their appearance(skin)[Attachments], https://volx.jp/bf2042-weapon-customize-skin-attachment, published on Nov. 14, 2021.

International Search Report dated Jan. 11, 2023 of International Application No. PCT/CN2022/120206.

Dress up game, https://baike.baidu.com/item/%E6%8D%A2%E8%A3%85%E7%B1%BB%E5%B0%8F%E6%B8%B8%E6%88%8F/1888312?fr=ge_ala.

* cited by examiner

METHOD FOR CHANGING SKIN OF VIRTUAL ITEM, AND NON-TRANSITORY STORAGE MEDIUM AND ELECTRONIC DEVICE THEREOF

CROSS-REFERENCE TO RELATED APPLICATION

The present disclosure is a U.S. National Stage Application of International Application No. PCT/CN2022/120206, filed on Sep. 21, 2022, which is based upon and claims the priority to the Chinese Patent Application NO. 202210420432.2, entitled "METHOD AND DEVICE FOR CHANGING SKIN OF VIRTUAL ITEM, STORAGE MEDIUM AND ELECTRONIC DEVICE", filed on Apr. 20, 2022, the entire contents of both of which are incorporated herein by reference for all purposes.

TECHNICAL FIELD

The present disclosure relates to the field of game technologies, and more particularly to a method and device for changing a skin of a virtual item, a non-transitory storage medium and an electronic device.

BACKGROUND

In games, in addition to specifying virtual characters, players generally also purchase, fight or otherwise obtain some virtual items as needed, such as pickaxes, firearms, etc. After the players obtain the virtual items, skins of the virtual items are generally system default skins.

SUMMARY

The present disclosure provides a method for changing a skin of a virtual item, a storage medium and an electronic device.

In a first aspect, the present disclosure provides a method for changing a skin of a virtual item, including:

in response to a skin-changing touch operation for a target part, displaying a skin control of a first to-be-selected skin corresponding to the target part, wherein the virtual item includes a plurality of parts and the target part is one of the plurality of parts, a graphical user interface is provided by a terminal device, and content displayed by the graphical user interface includes the virtual item; and in response to a first selection touch operation for a target skin control of a target skin in the skin control, changing a current skin of the target part into the target skin.

In a second aspect, the present disclosure provides a non-transitory computer-readable storage medium having a computer program stored thereon which, when executed by a processor, implements the method as described above.

In a third aspect, the present disclosure provides an electronic device, including: a processor; and a memory configured to store executable instructions of the processor; wherein the processor is configured to perform the method as described above by executing the executable instructions.

It should be understood that the above general description and the following detailed description are merely exemplary and explanatory; and should not limit the present disclosure.

BRIEF DESCRIPTION OF THE DRAWINGS

The drawings herein are incorporated in and constitute a part of the specification, illustrate embodiments consistent with the present disclosure, and together with the description serve to explain principles of the present disclosure. Apparently, the drawings in the following description are only some embodiments of the present disclosure. For those of ordinary skill in the art, other drawings may be obtained based on these drawings without paying any creative effort.

DETAILED DESCRIPTION

Figure 1:
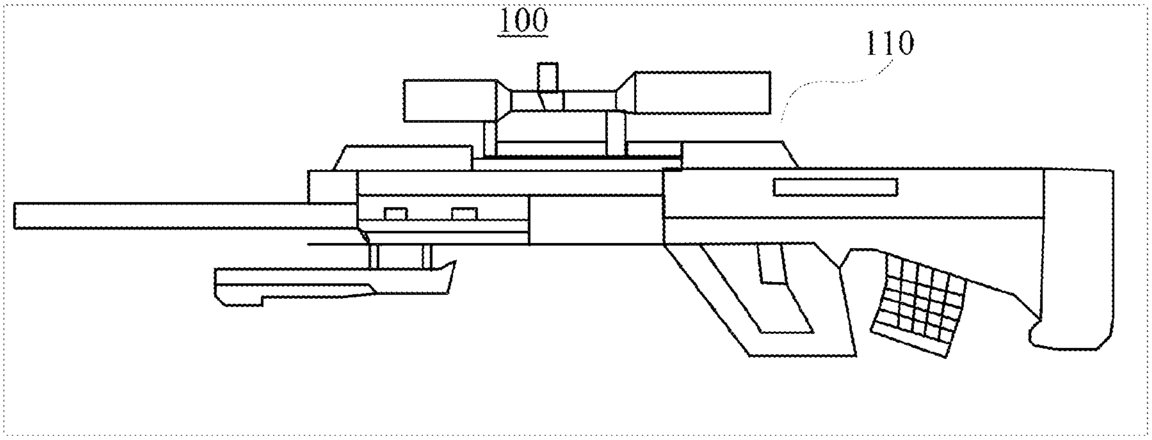
FIG. 1 shows a schematic diagram of an application scenario of a method for changing a skin of a virtual item according to an embodiment of the present disclosure.

Example embodiments will now be described more fully with reference to the accompanying drawings. However, the example embodiments may be implemented in a variety of forms and should not be construed as being limited to examples set forth herein; rather, these embodiments are provided so that the present disclosure will be more complete and comprehensive so as to comprehensively convey the concept of the example embodiments to those skilled in this art. The described features, structures, or characteristics may be combined in any suitable manner in one or more embodiments. In the description below; numerous specific details are set forth to provide a thorough understanding of embodiments of the present disclosure. However, those skilled in the art will appreciate that the technical solution of the present disclosure may be practiced without one or more of the specific details, or other methods, components, devices, steps and the like may be employed. In other instances, well-known technical solutions are not shown or described in detail to avoid obscuring various aspects of the present disclosure.

In addition, the drawings are merely schematic illustrations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

In the related arts, in games, in addition to specifying virtual characters, players generally also purchase, fight or otherwise obtain some virtual items as needed, such as pickaxes, firearms, etc. After the players obtain the virtual items, skins of the virtual items are generally system default skins. If the players want to change the skins of the virtual items according to their own preferences, they can only purchase or select entire skins for changing. Therefore, the existing method for changing a skin of a virtual item is relatively simple.

Embodiments of the present disclosure provide a method for changing a skin of a virtual item to improve the flexibility and richness of the skin changing. The following is a brief introduction to an application environment of the method for changing the skin of the virtual item provided by embodiments of the present disclosure.

Embodiments of the present disclosure are applied to a terminal device, which may be a local terminal device, such as a mobile phone, a tablet, a computer, or any other electronic device with a human-computer interaction interface, or may also be a client device in a cloud interaction system, such as a server, which will not be specifically limited in embodiments of the present disclosure. Referring to FIG. 1, the terminal device can provide a graphical user interface 100 when running, and content displayed in the graphical user interface 100 at least includes a virtual item 110 composed of a plurality of parts, and a skin-changing control for each part (not shown in FIG. 1). A player changes a skin of each part through a touch operation for the control. It should be explained that the control may be configured on each part body, or may also be configured in another area in the graphical user interface 100 that is independent of an area of the virtual item 110, which is not limited herein.

The following describes names or terms that appear in the description of one of embodiments of the present disclosure.

Virtual item:

it refers to a prop that can be used in a game scene for a task such as attack, competition, reclamation, capture, demolition, construction, etc., including but not limited to a virtual article that can be used by a virtual object to speed up one's own attributes, assist in combat or cause damage to other virtual objects, such as a firearm, a cold weapon, a grenade, a shield, a springboard, a puppet, etc.

Part:

it refers to an accessory assembled on the virtual item, such as muzzle, barrel, handguard, foregrip, magazine, receiver, gun stock, optical sight, mechanical sight, laser, flashlight, extended magazine, aiming Multiplier, flame suppressor, etc.

Component and Control:

the component refers to an element used to display or indicate information, such as a guide component configured to indicate a correspondence between individual parts in the virtual item and individual first skin-changing controls, etc., so as to display the virtual item and various parts in the virtual item. The control refers to a component with a touch response function, through which human-computer interaction between the player and the terminal device can be realized, for example, including a skin-changing control for changing a skin of the part, a skin control for skin changing, etc. Alternatively, the control may also have the same information display or indication function as the component, which is not specifically limited in embodiments of the present disclosure.

Touch operation:

the touch operation in embodiments of the present disclosure includes a selection touch operations, a skin-changing touch operation, etc. The player operates the corresponding control through the touch operation to achieve control of the corresponding virtual object in the game, such as the virtual character and the virtual item. The touch operation in embodiments of the present disclosure may take any form, such as clicking, dragging, sliding, long pressing, double-clicking, etc., which is not limited here.

Skin:

The skin in embodiments of the present disclosure refers to a decoration used to distinguish and beautify virtual items in a virtual game world, which may be composed of patterns, images, icons, various colors, etc. The skin may be acquired through system pre-configuration, automatic configuration, player purchase, game competitive acquisition, merchant gift, teammate gift, etc., which will not listed one by one here.

Figure 2:
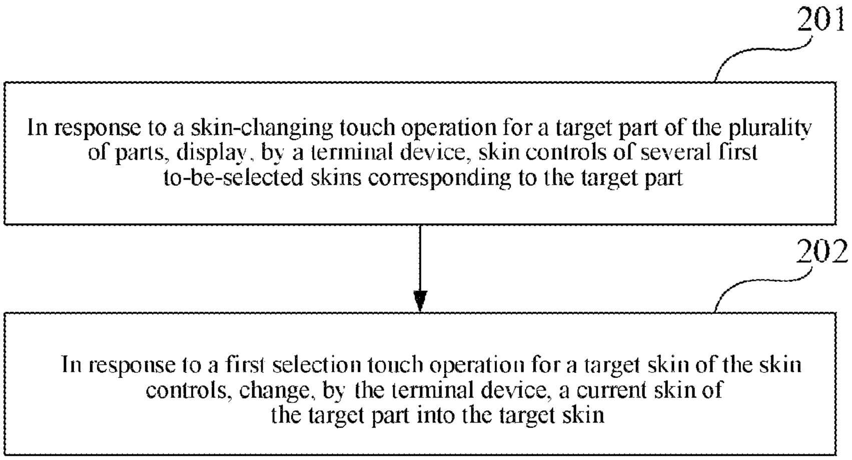
FIG. 2 shows a flowchart of a method for changing a skin of a virtual item according to an embodiment of the present disclosure.

The following takes the terminal device being an execution subject, the method for changing the skin of the virtual item being applied to the terminal device and changing the skin of the part in the virtual item as examples for illustration. Referring to FIG. 2, the method for changing the skin of the virtual item provided by embodiments of the present disclosure includes steps 201 to 202.

In the step 201, in response to a skin-changing touch operation for a target part of a plurality of parts, the terminal device displays skin controls of several first to-be-selected skins corresponding to the target part.

The skin-changing touch operation refers to an awakening operation for a skin control. The player selects the part whose skin needs to be changed by the player from the plurality of parts through the skin-changing touch operation (e.g., clicking, double-clicking, long pressing, sliding, etc.) in a corresponding touch area, such as an area where the part is located or an area where a control corresponding to the part is located. In response to the skin-changing touch operation, the terminal device determines the part corresponding to the skin-changing touch operation as the target part, retrieves all or part of skins corresponding to the target part from a skin library as the first to-be-selected skins, and displays the skin controls corresponding to the first to-be-selected skins for the player to select. It should be explained that the skin control corresponding to the first to-be-selected skin may be displayed on a current display interface, reducing the number of page switches, thereby improving the efficiency of skin changing; alternatively, a next interface may also be jumped to, so as to enlarge or highlight the skin control corresponding to the first to-be-selected skin, which makes it more intuitive to view details of each first to-be-selected skin, and makes it convenient for the player to operate.

In the step 202, in response to a first selection touch operation for a target skin of the skin controls, the terminal device changes a current skin of the target part into the target skin.

After the terminal device displays the skin controls of the plurality of first to-be-selected skins, the player selects a skin he/she wants to use through the first selection touch operation such as clicking, double-clicking, long pressing, sliding, etc. In response to the first selection touch operation, the terminal device determines a skin corresponding to the first selection touch operation as the target skin, for example, determines a skin corresponding to a clicking position, double-clicking position, or long pressing position as the target skin, or determines a skin corresponding to an ending position of the sliding operation as the target skin. After obtaining the target skin, the terminal device changes the current skin of the target part into the target skin to complete the skin changing operation.

In the method for changing the skin of the virtual item provided by embodiments of the present disclosure, in response to the skin-changing touch operation by the player for the target part of the plurality of parts, the skin controls of the plurality of first to-be-selected skins corresponding to the target part are displayed for the further selection by the player, and in response to the first selection touch operation for the target skin of the skin controls, the current skin of the target part is changed into the target skin. In the embodiments of the present disclosure, the skin changing is performed for the part in the virtual item, which facilitates the player to freely assemble the skin according to his/her own preferences without the need to replace the entire skin in a conventional manner, solves the technical problem that the existing method for changing the skin of the virtual item is relatively simple, and achieves the technical effect of improving the flexibility and the combination richness of the skin changing of the virtual item.

Figure 3:
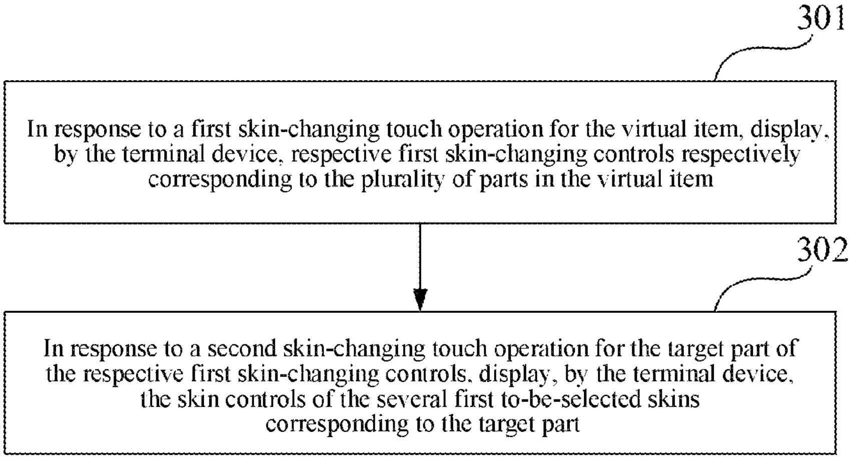
FIG. 3 shows a flowchart of a method for changing a skin of a virtual item according to an embodiment of the present disclosure.

Referring to FIG. 3, in an embodiment of the present disclosure, the step 201 of the terminal device displaying the skin controls of the several first to-be-selected skins corresponding to the target part in response to the skin-changing touch operation for the target part of the plurality of parts includes steps 301 to 302.

In the step 301, in response to a first skin-changing touch operation for the virtual item, the terminal device displays respective first skin-changing controls respectively corresponding to the plurality of parts in the virtual item.

In this embodiment, the first skin-changing touch operation refers to an operation for awakening the display of the first skin-changing controls respectively corresponding to respective parts. The first skin-changing control may be one independent control or a plurality of controls corresponding to the respective parts one by one, and accordingly, an operation area corresponding to the first skin-changing touch operation may be a fixed area or any area on the virtual item, which is not specifically limited in this embodiment. For example, referring to FIG. 4, a muzzle part 401*a* corresponds to a muzzle skin-changing control 401*b*, a barrel part 402*a* corresponds to a barrel skin-changing control 402*b*, a foregrip part 403*a* corresponds to a foregrip skin-changing control 403*b*, and other parts and skin-changing controls corresponding to these parts are not all shown in FIG. 4, which are only examples here.

In the step 302, in response to a second skin-changing touch operation for the target part of the respective first skin-changing controls, the terminal device displays the skin controls of the several first to-be-selected skins corresponding to the target part.

Figure 4:
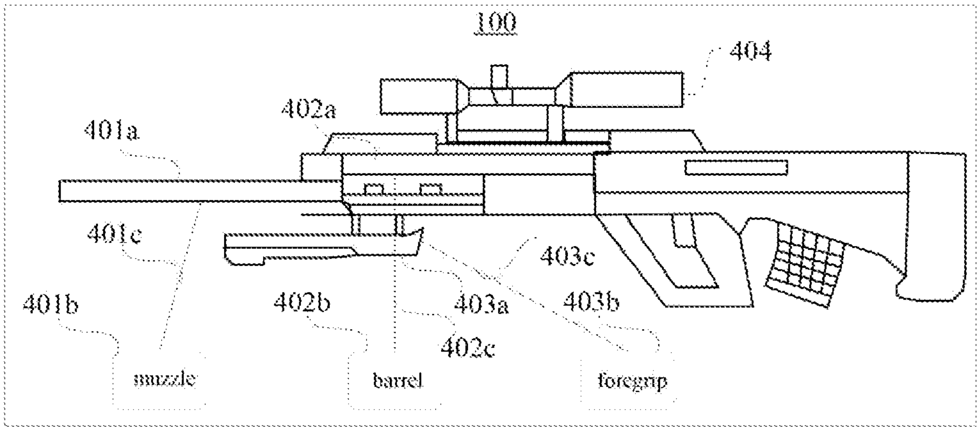
FIG. 4 shows a graphical user interface diagram of a method for changing a skin of a virtual item according to an embodiment of the present disclosure.

The second skin-changing touch operation refers to an operation in which the player selects the target part whose skin needs to be changed from the plurality of first skin-changing controls. For example, a muzzle suppressor 404 in FIG. 4 is selected as the target part through the second skin-changing touch operation such as clicking, double-clicking, long pressing, sliding, etc. In response to the second skin-changing touch operation, the terminal device, based on the target part (e.g., the muzzle suppressor 404) corresponding to the second skin-changing touch operation, displays the skin controls of the first to-be-selected skins corresponding to the muzzle suppressor, such as a "default skin" skin control, a "forest camouflage" skin control, a "desert camouflage" skin control, a "ice and snow camouflage" skin control, or the like in FIG. 5, in the current display interface or by jumping to another interface, so that the player can perform a skin selection operation.

In embodiments of the present disclosure, the first skin-changing controls respectively corresponding to the respective parts in the virtual item are first displayed according to the first skin-changing touch operation of the player for the player to select the target part whose skin needs to be changed, and then according to the second skin-changing touch operation for the target part by the player, the skin controls of the first to-be-selected skins corresponding to the target part are displayed for the player to select the skin. The player has high selectivity, the flexibility of the skin changing can be greatly improved, the richness and diversity of the skin combinations of the virtual item are improved, and the player's skin-changing experience can also greatly improved.

Figure 6:
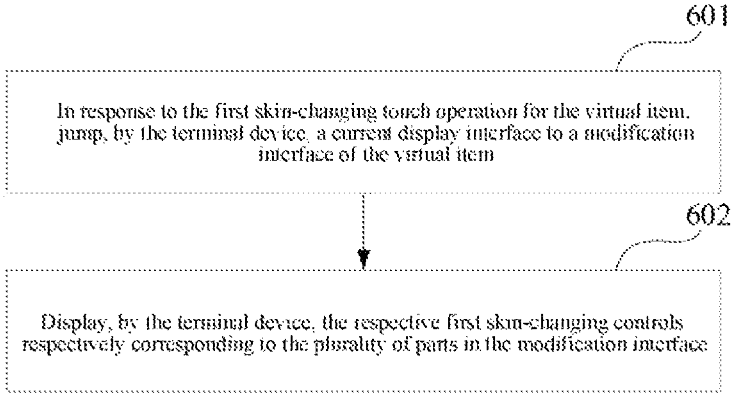
FIG. 6 shows a flowchart of a method for changing a skin of a virtual item according to an embodiment of the present disclosure.

Referring to FIG. 6, in an embodiment of the present disclosure, the step 301 of the terminal device displaying the respective first skin-changing controls respectively corresponding to the plurality of parts in the virtual item in response to the first skin-changing touch operation for the virtual item includes steps 601 to 602.

In the step 601, in response to the first skin-changing touch operation for the virtual item, the terminal device jumps a current display interface to a modification interface of the virtual item.

The modification interface refers to an interface used to display individual parts of the virtual item as a whole, which is different from an interface during a game that contains various virtual characters and game scenes. The virtual item is displayed in an enlarged and highlighted manner in the modification interface. The player can intuitively see positions of the individual parts and an overall structure of the virtual item, and then more intuitively determine the target part that needs the skin changing operation.

In the step 602, the terminal device displays the respective first skin-changing controls respectively corresponding to the plurality of parts in the modification interface.

It should be explained that the first skin-changing touch operation in this embodiment of the present disclosure also refers to an operation used to awaken the display of the first skin-changing controls respectively corresponding to the individual parts. However, what is different from the above-mentioned embodiments is that in this embodiment, in response to the first skin-changing touch operation, the terminal device first jumps to the modification interface, and then awakens the display of the first skin-changing controls respectively corresponding to the individual parts in the modification interface.

In embodiments of the present disclosure, in response to the first skin-changing touch operation, the modification interface is first jumped to, where the virtual item is displayed in the enlarged and highlighted manner, so that the player can intuitively see the overall structure and the positions of the individual parts of the virtual item, and then more intuitively determine the target part that needs the skin changing operation, improving the convenience of the player's operation, and thus improving the player's user experience.

In an embodiment of the present disclosure, after the step 301 of the terminal device responding to the first skin-changing touch operation for the virtual item, the method for changing the skin of the virtual item further includes step A.

In the step A, the terminal device displays a guide component configured to indicate a correspondence between respective parts in the virtual item and the respective first skin-changing controls.

The guide component is configured to indicate the correspondence between the respective parts in the virtual item and the respective first skin-changing controls. For example, with continued reference to FIG. 4, an end of a guide component 401*c* is connected to the muzzle part 401*a*, and the other end is connected to the muzzle skin-changing control 401*b*, and the guide component 401*c* is configured to indicate a correspondence between the muzzle 401*a* and the muzzle skin-changing control 401*b*; an end of a guide component 402*c* is connected to the barrel part 402*a*, and the other end is connected to the barrel skin-changing control 402*b*, and the guide component 402*c* is configured to indicate a correspondence between the barrel 402*a* and the barrel skin-changing control 402*b*; and an end of a guide component 403*c* is connected to the frontgrip part 403*a*, and the other end is connected to the frontgrip skin-changing control 403*b*, and the guide component 403*c* is configured to indicate a correspondence between the frontgrip 403*a* and the frontgrip skin-changing control 403*b*.

In embodiments of the present disclosure, the corresponding guide component is configured for each first skin-changing control, which facilitates the player to clearly determine the part corresponding to each first skin-changing control, as well as the position of the part, so as to facilitate the player to quickly select, through the corresponding first skin-changing control, the target part that needs the skin changing, avoid mistakenly operating another part due to some parts being too small, and greatly improve the convenience and accuracy of the player's operation.

In an embodiment of the present disclosure, after the step 302 of the terminal device responding to the second skin-changing touch operation for the target part of the respective first skin-changing controls, the method for changing the skin of the virtual item further includes step B.

In the step B, in response to a second selection touch operation for a skin recommendation control, the terminal device displays a skin control of a recommendation skin of the target part.

The terminal device predetermines the recommendation skin corresponding to each part and stores it. The player may select the skin recommendation control through the second selection touch operation such as clicking, double-clicking, long pressing, and sliding. In response to the second selection touch operation for the skin recommendation control, the terminal device determines several recommendation skins for the target part, and displays skin controls corresponding to the several recommendation skins on the current interface for the player to select.

In embodiments of the present disclosure, in response to the second selection touch operation for the skin recommendation control, the skin control of the recommendation skin for the target part is displayed, providing the player with some optional skins that are more suitable for the current scene, avoiding some other unnecessary operations such as level confirmation, identity confirmation, etc., and greatly improving the efficiency of the skin changing. Especially for some players who have difficulty choosing, they can quickly determine a target skin from several recommendation skins for assembly, improving the player's skin-changing efficiency and skin-changing experience.

Figure 7:
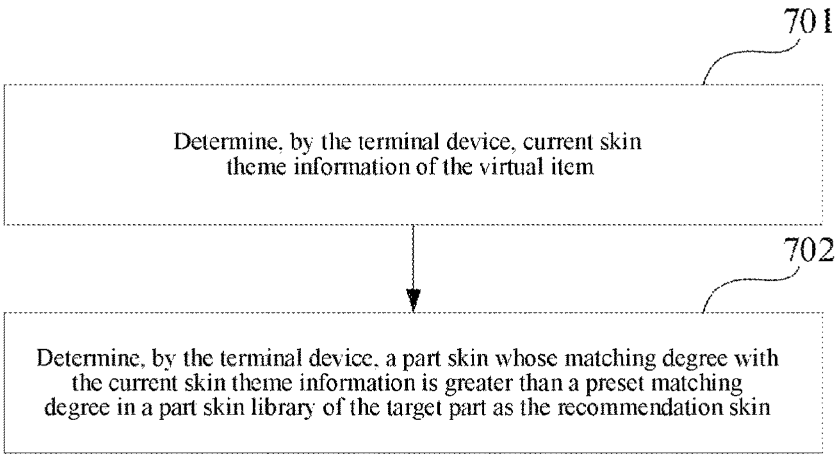
FIG. 7 shows a flowchart of a method for changing a skin of a virtual item according to an embodiment of the present disclosure.

Referring to FIG. 7, in an embodiment of the present disclosure, before the step B of the terminal device displaying the skin control of the recommendation skin of the target part, the method for changing the skin of the virtual item further includes steps 701 to 702.

In the step 701, the terminal device determines current skin theme information of the virtual item.

The skin theme information may be a color, a pattern, a picture, etc., which is not specifically limited in this embodiment of the present disclosure.

In the step 702, the terminal device determines, a part skin whose matching degree with the current skin theme information is greater than a preset matching degree in a part skin library of the target part, as the recommendation skin.

The terminal device may determine the matching degree between the current skin theme and each part skin through pixel value comparison, pattern texture comparison, or calculation of image similarity between the current skin theme and each part skin, and then use a part skin whose matching degree is greater than the preset matching degree, for example, greater than 70% or 80%, as the recommendation skin.

In embodiments of the present disclosure, the current skin theme information of the virtual item is first determined, and then the part skin whose matching degree with the current skin theme information is greater than the preset matching degree in the part skin library of the target part is determined as the recommendation skin, which ensures that the resulting target skin of the target part is as consistent or similar as possible to the current skin style of the virtual item, thereby improving the uniformity and overall aesthetics of the virtual item style.

In an embodiment of the present disclosure, a size of a skin control of each recommendation skin is positively related to the corresponding matching degree. In other words, the greater the matching degree, the larger the skin control, and the smaller the matching degree, the smaller the skin control, so that the player can intuitively determine a recommendation index of each recommendation skin, making it convenient for the player to quickly and easily determine the target skin from the respective recommendation skins.

In an embodiment of the present disclosure, skin controls of respective recommendation skins are arranged in order according to magnitudes of corresponding matching degrees. For example, a skin control with a greater matching degree is ranked higher, and a skin control with a smaller matching degree is ranked lower, so that the player can intuitively determine a recommendation index of each recommendation skin, making it convenient for the player to quickly and easily determine the target skin from the respective recommendation skins.

Figure 8:
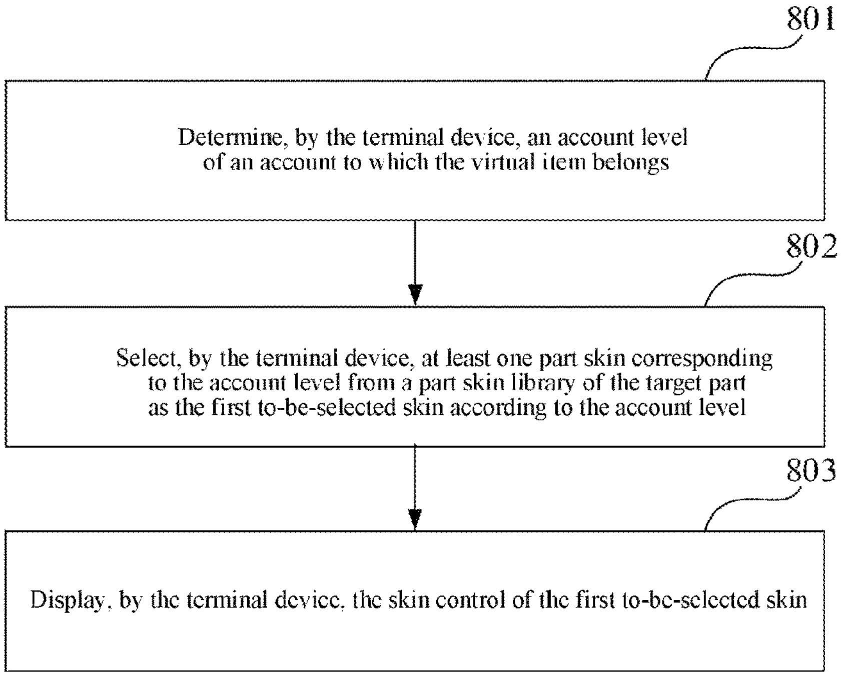
FIG. 8 shows a flowchart of a method for changing a skin of a virtual item according to an embodiment of the present disclosure.

Referring to FIG. 8, in an embodiment of the present disclosure, the step 201 of the terminal device displaying the skin controls of the several first to-be-selected skins corresponding to the target part includes steps 801 to 803.

In the step 801, the terminal device determines an account level of an account to which the virtual item belongs.

Game levels corresponding to different players are different. Therefore, in embodiments of the present disclosure, an account to which the virtual item belongs is first determined, that is, the account level of the corresponding player is first determined.

In the step 802, the terminal device selects, according to the account level, at least one part skin corresponding to the account level from the part skin library of the target part as the first to-be-selected skin.

For example, the part skin library of the target part contains 1-50 changeable skins. Skins that can be possessed by different levels are different. A first-level player can use part skins with serial numbers 1-20, and the corresponding first to-be-selected skins are the part skins with the serial numbers 1-20. A second-level player can use part skins with serial numbers 1-40, and the corresponding first to-be-selected skins are the part skins with the serial numbers 1-40. A third-level player can use part skins with serial numbers 1-50, and the corresponding first to-be-selected skins are the part skins with the serial numbers 1-50.

In the step 803, the terminal device displays the skin control of the first to-be-selected skin.

As in the above steps, after determining the first to-be-selected skin, the terminal device displays the skin control corresponding to the first to-be-selected skin on the current interface. For example, the skin controls may be arranged according to serial numbers, displayed in the form of a list, or displayed in a ring on a periphery of the target part, etc., which is not specifically limited in this embodiment of the present disclosure, and may be specifically set according to the actual situation.

In embodiments of the present disclosure, the account level of the account to which the virtual item belongs is first determined, and the at least one part skin corresponding to the account level is selected, as the first to-be-selected skin, from the part skin library of the target part according to the account level, so as to display the control. Different levels of users correspond to different levels of part skins, which greatly improve the diversity of part skin changing, and also avoid the need for the player to further perform an operation such as determining his/her own level and character information, etc., thus improving operational efficiency.

Figure 9:
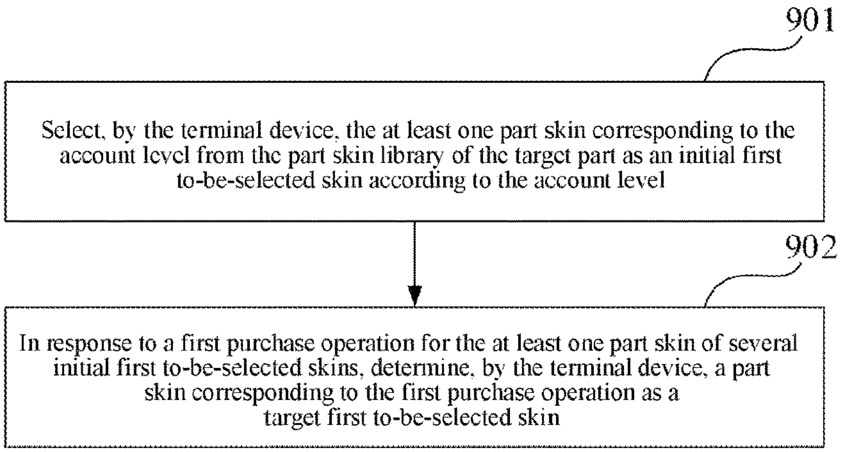
FIG. 9 shows a flowchart of a method for changing a skin of a virtual item according to an embodiment of the present disclosure.

Referring to FIG. 9, in an embodiment of the present disclosure, the step 802 of the terminal device selecting, according to the account level, the at least one part skin corresponding to the account level from the part skin library of the target part as the first to-be-selected skin includes steps 901 to 902.

In the step 901, the terminal device selects, according to the account level, the at least one part skin corresponding to the account level from the part skin library of the target part as an initial first to-be-selected skin.

The terminal device may select the at least one part skin corresponding to the account level from the part skin library of the target part as the initial first to-be-selected skin based on the same manner in the above step 802, which will not be described again here.

In the step 902, in response to a first purchase operation for at least one part skin of several initial first to-be-selected skins, the terminal device determines a part skin corresponding to the first purchase operation as a target first to-be-selected skin.

Based on the plurality of initial first to-be-selected skins obtained as above, the terminal device may display; through a display component or a payment control, the plurality of initial first to-be-selected skins on the current interface and purchase amounts corresponding to the respective initial first to-be-selected skins for the player, for the player to select to purchase. The player may select one or more of the skins and purchase the one or more of the skins through the first purchase operation. After the payment is successful, the purchased one or more skins will be the above-mentioned target first to-be-selected skins. The terminal device will put the target first to-be-selected skins into the part skin library of the player for use in the subsequent changing by the player.

In embodiments of the present disclosure, the at least one part skin corresponding to the account level is selected, as the initial first to-be-selected skin, from the part skin library of the target part according to the account level, and then after the first purchase operation of the player for the at least one part skin among the plurality of initial first to-be-selected skins, the part skin corresponding to the first purchase operation is determined as the target first to-be-selected skin, which can improve the interactivity between the merchant and the players.

Figure 10:
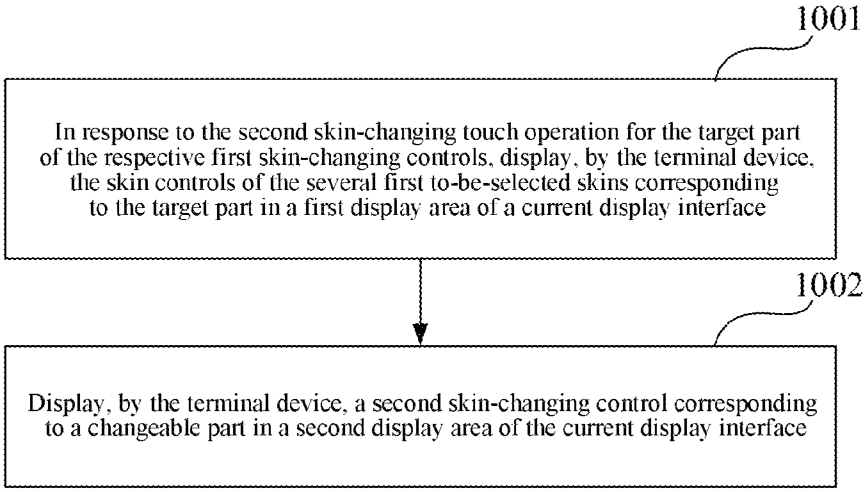
FIG. 10 shows a flowchart of a method for changing a skin of a virtual item according to an embodiment of the present disclosure.

Referring to FIG. 10, in an embodiment of the present disclosure, the step 302 of the terminal device displaying the skin controls of the several first to-be-selected skins corresponding to the target part in response to the second skin-changing touch operation for the target part of the respective first skin-changing controls includes steps 1001 to 1002.

In the step 1001, in response to the second skin-changing touch operation for the target part of the respective first skin-changing controls, the terminal device displays, in a first display area of the current display interface, the skin controls of the several first to-be-selected skins corresponding to the target part.

Figure 5:
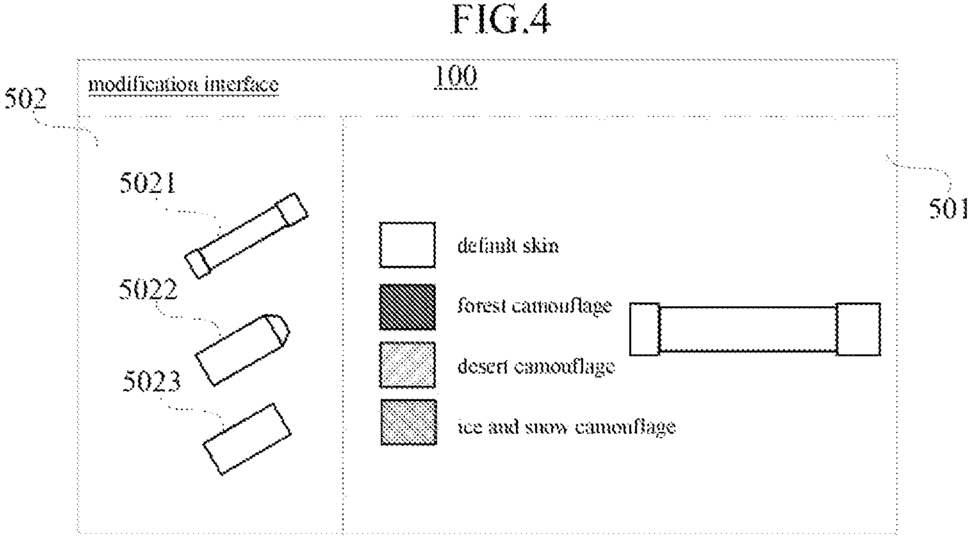
FIG. 5 shows another graphical user interface diagram of a method for changing a skin of a virtual item according to an embodiment of the present disclosure.

For example, with continued reference to FIG. 5, four skin controls of "default skin", "forest camouflage", "desert camouflage" and "ice and snow camouflage" are displayed in a first display area 501.

In the step 1002, the terminal device displays, in a second display area of the current display interface, a second skin-changing control corresponding to a changeable part.

The changeable part is a part that is available for being changed at an installation position of the target part in the virtual item. For example, a muzzle flash suppressor 5022 and a muzzle anti-bounce device 5023 may also be installed at a position of a muzzle suppressor 5021, and the muzzle suppressor 5021, the muzzle flash suppressor 5022 and the muzzle anti-bounce device 5023 are all changeable parts corresponding to this position. The several changeable parts may be displayed in the second display area 502 in the form of a list as shown in FIG. 5, or may be distributed or circumferentially arranged in the second display area 502. It should be noted that the first display area 501 and the second display area 502 are independent of each other, which may be, for example, distributed left and right, distributed up and down, circumferentially distributed, etc., which are not specifically limited in embodiments of the present disclosure.

In embodiments of the present disclosure, the skin controls of the plurality of first to-be-selected skins corresponding to the target part are displayed in the first display area of the current display interface, and the second skin-changing control corresponding to the changeable part is simultaneously displayed in the second display area, which is convenient to perform the skin changing for the part while changing the skin of another part at the same position as the part, and perform the skin changing on the replaced part, greatly facilitating the player's operation and improving the player's gaming experience.

In an embodiment of the present disclosure, after the step 1002 of the terminal device displaying, in the second display area of the current display interface, the second skin-changing control corresponding to the changeable part, the method for changing the skin of the virtual item further includes step C.

In the step C, in response to a third selection touch operation for a target changing part of a plurality of second skin-changing controls, the terminal device displays a second to-be-selected skin corresponding to the target changing part.

With continued reference to FIG. 5, the terminal device displays the plurality of second skin-changing controls in the form of a list in the second display area 502. If the player needs to change the part, the player only needs to select the target changing part that needs to be changed through the third selection operation such as clicking, double-clicking, long pressing, sliding, etc., and then the terminal device will display the second to-be-selected skins corresponding to the target changing part for the player to select, which can greatly improve the diversity of the skin changing, the efficiency of the part skin changing and the richness of the player operation.

In an embodiment of the present disclosure, before the step 201 of the terminal device displaying the skin controls of the several first to-be-selected skins corresponding to the target part in response to the skin-changing touch operation for the target part of the plurality of parts, the method for changing the skin of the virtual item further includes step D.

In the step D, in response to a skin acquisition operation for the target part of the plurality of parts, the terminal device stores several skins corresponding to the skin acquisition operation as to-be-selected skins in a part skin library to which the target part belongs.

In embodiments of the present disclosure, the skin acquisition operation manner may be as follows: the player acquires the skin by completing the task, competing, etc., a game developer pre-configures a skin for each part in the virtual item, the player purchases the corresponding skin through recharge, etc., the player inherits a skin after a teammate quits the game or dies in battle, and a game merchant gives or distributes a skin to the player in a certain scene, activity or time interval. After acquiring the corresponding skin through the skin acquisition operation, the player stores the skin in his/her own part skin library for use in the next skin changing. It should be explained that one part skin library may be correspondingly configured for one player or one game account, that is, the player can put all the skins he/she acquires in the part skin library. In addition, the part skin library may be divided into a plurality of sub-libraries according to different types of parts, and these sub-libraries respectively store skins of different parts. For example, a first sub-library is a connection part (e.g., the muzzle) skin library, which stores several muzzle skins, and a second sub-library is a barrel skin library, which stores several barrel skins, and so on.

In embodiments of the present disclosure, for the skin acquisition operation for the target part of the plurality of parts, several skins corresponding to the skin acquisition operation are used as the to-be-selected skins to be stored in the part skin library to which the target part belongs. During the game, the player can acquire the skin the player needs at any time according to a game progress and his/her own preferences, which greatly enhances the player's game participation and experience. In addition, in the embodiments of the present disclosure, the to-be-selected skins acquired by the player through the skin acquisition operation are stored in the part skin library to which the target part belongs, so that the skin can be directly retrieved from the part skin library in a subsequent skin changing as needed, which is convenient and fast, and can greatly improve the efficiency of the part skin changing and the player experience.

Figure 11:
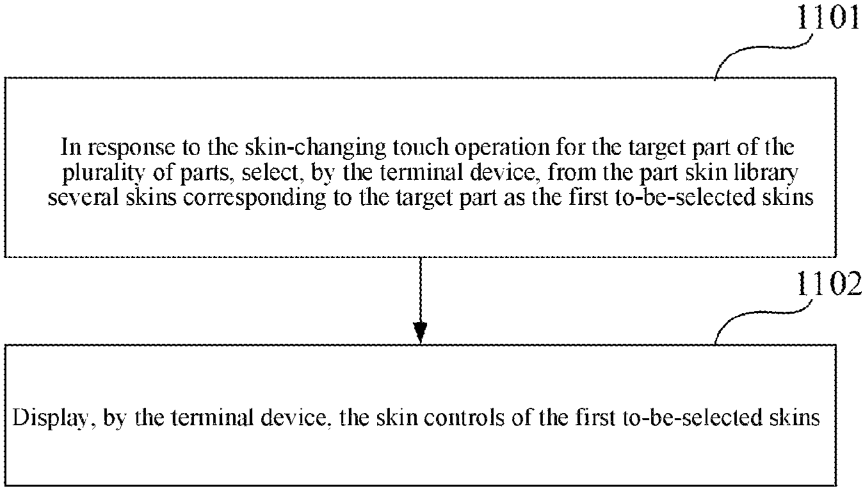
FIG. 11 shows a flowchart of a method for changing a skin of a virtual item according to an embodiment of the present disclosure.

Correspondingly, referring to FIG. 11, the step 201 of the terminal device displaying the skin controls of the several first to-be-selected skins corresponding to the target part in response to the skin-changing touch operation for the target part of the plurality of parts includes steps 1101-1102.

In the step 1101, in response to the skin-changing touch operation for the target part of the plurality of parts, the terminal device selects from a part skin library several skins corresponding to the target part as the first to-be-selected skins.

In the step 1102, the terminal device displays the skin controls of the first to-be-selected skins.

In embodiments of the present disclosure, in response to the skin-changing touch operation for the target part of the plurality of parts, the several skins corresponding to the target part are directly selected from the part skin library as the first to-be-selected skins, thus avoiding a step of acquiring the skin in real time from a service terminal, a user terminal, etc., avoiding wasting the computing resources of the terminal device, greatly improving the efficiency of determining the first to-be-selected skin, and further improving the player's gaming experience.

In an embodiment of the present disclosure, the step D of the terminal device, in response to the skin acquisition operation for the target part of the plurality of parts, storing the several skins corresponding to the skin acquisition operation as the to-be-selected skins in the part skin library to which the target part belongs includes step E.

In the step E, in response to a second purchase operation for a skin of the target part of the plurality of parts, the terminal device stores several skins corresponding to the second purchase operation as the to-be-selected skins in the part skin library to which the target part belongs.

What is different from the above embodiments is that, in this embodiment of the present disclosure, the skin of the target part is acquired through the second purchase operation, that is, the above-mentioned skin acquisition operation is defined to the second purchase operation in this embodiment of the present disclosure. After the terminal device displays a plurality of skins of the target part provided by it on the graphical user interface, the player can purchase the skin the player needs through game recharge and other manners, which combines a pure virtual game experience with a real transaction, thereby greatly improving a commercial attribute of the virtual item and the corresponding game. In addition, configuring the second purchase operation to determine the to-be-selected skin can greatly improve the player's purchase rate and game participation.

In an embodiment of the present disclosure, the skin control of the first to-be-selected skin is associated with a skin purchase control of the first to-be-selected skin.

The skin purchase control may be a payment control, a mall jump control, a shopping cart, or other controls for purchasing the skin, which will not be exhaustive in embodiments of the present disclosure. The association in this embodiment refers to a one-to-one correspondence between the skin control and the skin purchase control. The skin purchase control may be configured on the skin control or in other areas other than the skin control, as long as the skin control is associated with the skin purchase control. For example, "desert camouflage" skin purchase control is configured in the lower right corner of the "desert camouflage" skin control, and the player only needs to act on the skin purchase control through clicking or any other touch operation to purchase the "desert camouflage" skin.

Figure 12:
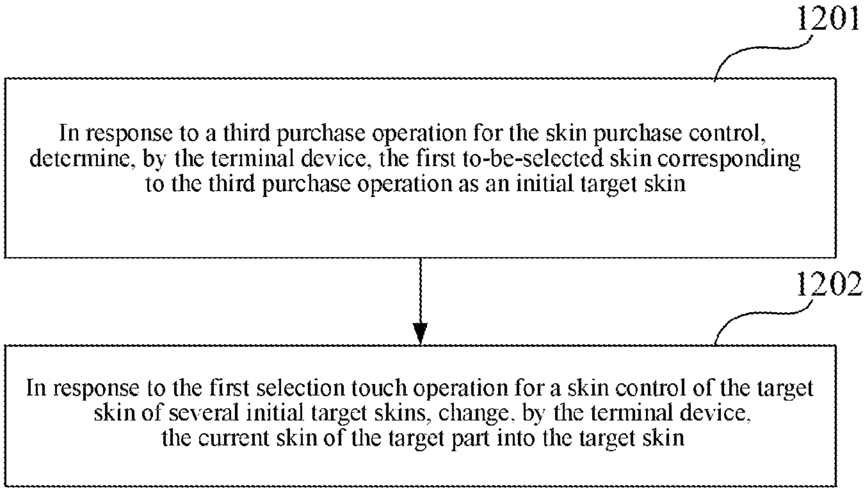
FIG. 12 shows a flowchart of a method for changing a skin of a virtual item according to an embodiment of the present disclosure.

Correspondingly, referring to FIG. 12, the step 202 of the terminal device changing the current skin of the target part into the target skin in response to the first selection touch operation for the target skin of the skin control includes steps 1201 to 1202.

In the step 1201, in response to a third purchase operation for the skin purchase control, the terminal device determines a first to-be-selected skin corresponding to the third purchase operation as an initial target skin.

It should be explained that the third purchase operation is not the above-mentioned touch operation such as clicking, double-clicking, and sliding, but refers to a player's purchase behavior operation for the skin. The third purchase operation may be a direct payment operation with game currency, or may be a purchase operation by jumping to an interface such as a skin mall or item mall, which is not specifically limited in this embodiment of the present disclosure. The terminal device determines a purchase result for each first to-be-selected skin based on the player's third purchase operation for the skin, and uses the successfully purchased first to-be-selected skin as the initial target skin for the continued selection by the player.

In the step 1202, in response to the first selection touch operation for a skin control of the target skin of several initial target skins, the terminal device changes the current skin of the target part into the target skin.

After the terminal device obtains the initial target skin based on the third purchase operation in the above step 1201, the terminal device displays skin controls of a plurality of initial target skins, and then the player selects the skin the player wants to use as the target skin through the first selection touch operation such as clicking, double-clicking, long pressing, and sliding, and changes the current skin of the target part into the target skin to complete the skin changing operation for the target part.

Figure 13:
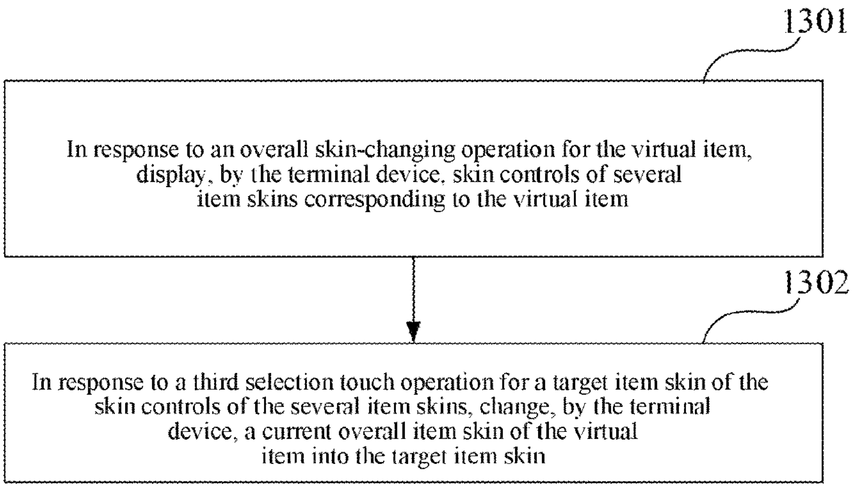
FIG. 13 shows a flowchart of a method for changing a skin of a virtual item according to an embodiment of the present disclosure.

Referring to FIG. 13, in an embodiment of the present disclosure, the method for changing the skin of the virtual item further includes steps 1301 to 1302.

In the step 1301, in response to an overall skin-changing operation for the virtual item, the terminal device displays skin controls of several item skins corresponding to the virtual item.

The virtual item is composed of a plurality of parts, and the corresponding item skin refers to an overall item skin composed of a plurality of part skins. It should be explained that the item skin may be the same style or the same theme skin, or may be a complete skin composed of different theme part skins that can be directly applied to the virtual item, which is not specifically limited in this embodiment of the present disclosure. The overall skin-changing control may be configured on a virtual item body, or may be configured in any area independent of the virtual item. This embodiment does not impose any restriction on the size, form, position, etc. of the overall skin-changing control, which may be specifically configured according to actual situations. The terminal device displays the overall skin-changing control on the current display interface, and the player may act on the overall skin-changing control through any overall skin-changing operation such as clicking, double-clicking, sliding, and long pressing. In response to the overall skin-changing operation, the terminal device displays the pre-configured skin controls for several item skins of the virtual item for the player to select the item skin that needs to be used.

In the step 1302, in response to a third selection touch operation for a target item skin of the skin controls of the several item skins, the terminal device changes a current overall item skin of the virtual item into the target item skin.

The player determines the target device skin that the player wants to use from several item skins through any third selection touch operation such as clicking, double-clicking, sliding, and long pressing, and in response to the third touch operation for the target item skin, a skin changing device for the virtual item changes the current overall item skin of the virtual item into the target item skin.

In embodiments of the present disclosure, when the player needs to perform the overall skin changing for the virtual item, the player only needs to perform the overall skin changing operation to trigger the display of the skin controls of the several item skins for the player to select, and the player can change the current overall item skin of the virtual item into the target item skin through the third selection touch operation for the target item skin of the several item skins, which is convenient and quick, and greatly improves the efficiency of the virtual item skin changing.

Figure 14:
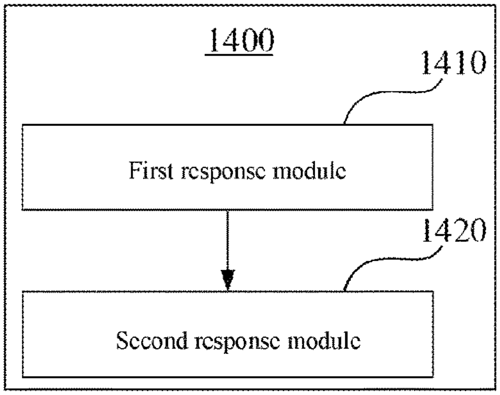
FIG. 14 shows a schematic structural diagram of a device for changing a skin of a virtual item according to an embodiment of the present disclosure.

Referring to FIG. 14, in order to implement the method for changing the skin of the virtual item, an embodiment of the present disclosure provides a device 1400 for changing a skin of a virtual item. A graphical user interface is provided, and the graphical user interface at least includes a virtual item composed of a plurality of parts. FIG. 14 shows a schematic architecture diagram of the device 1400 for changing the skin of the virtual item, and the device 1400 includes a first response module 1410 and a second response module 1420.

The first response module 1410 is configured to, in response to a skin-changing touch operation for a target part of the plurality of parts, display skin controls of several first to-be-selected skins corresponding to the target part.

The second response module 1420 is configured to, in response to a first selection touch operation for a target skin of the skin controls, change a current skin of the target part into the target skin.

In the device 1400 for changing the skin of the virtual item, in response to the skin-changing touch operation by the player for the target part of the plurality of parts, the skin controls of the plurality of first to-be-selected skins corresponding to the target part are displayed for the further selection by the player, and in response to the first selection touch operation for the target skin of the skin controls, the current skin of the target part is changed into the target skin. In the embodiments of the present disclosure, the skin changing is performed for the part in the virtual item, which facilitates the player to freely assemble the skin according to his/her own preferences without the need to replace the entire skin in a conventional manner, solves the technical problem that the existing method for changing the skin of the virtual item is relatively simple, and achieves the technical effect of improving the flexibility and the combination richness of the skin changing of the virtual item.

In an embodiment of the present disclosure, the first response module 1410 is specifically configured to, in response to a first skin-changing touch operation for the virtual item, display respective first skin-changing controls respectively corresponding to the plurality of parts in the virtual item; and in response to a second skin-changing touch operation for the target part of the respective first skin-changing controls, display the skin controls of the several first to-be-selected skins corresponding to the target part.

In embodiments of the present disclosure, the first skin-changing controls respectively corresponding to the respective parts in the virtual item are first displayed according to the first skin-changing touch operation of the player for the player to select the target part whose skin needs to be changed, and then according to the second skin-changing touch operation for the target part by the player, the skin controls of the first to-be-selected skins corresponding to the target part are displayed for the player to select the skin. The player has high selectivity, the flexibility of the skin changing can be greatly improved, the richness and diversity of the skin combinations of the virtual item are improved, and the player's skin-changing experience can also greatly improved.

In an embodiment of the present disclosure, the first response module 1410 is specifically configured to, in response to the first skin-changing touch operation for the virtual item, jump a current display interface to a modification interface of the virtual item; and display, in the modification interface, the respective first skin-changing controls respectively corresponding to the plurality of parts.

In embodiments of the present disclosure, in response to the first skin-changing touch operation, the modification interface is first jumped to, where the virtual item is displayed in the enlarged and highlighted manner, so that the player can intuitively see the overall structure and the positions of the individual parts of the virtual item, and then more intuitively determine the target part that needs the skin changing operation, improving the convenience of the player's operation, and thus improving the player's user experience.

In an embodiment of the present disclosure, the first response module 1410 is further configured to display a guide component configured to indicate a correspondence between respective parts in the virtual item and the respective first skin-changing controls.

In embodiments of the present disclosure, the corresponding guide component is configured for each first skin-changing control, which facilitates the player to clearly determine the part corresponding to each first skin-changing control, as well as the position of the part, so as to facilitate the player to quickly select, through the corresponding first skin-changing control, the target part that needs the skin changing, avoid mistakenly operating another part due to some parts being too small, and greatly improve the convenience and accuracy of the player's operation.

In an embodiment of the present disclosure, the first response module 1410 is specifically configured to, in response to a second selection touch operation for a skin recommendation control, display a skin control of a recommendation skin of the target part.

In embodiments of the present disclosure, in response to the second selection touch operation for the skin recommendation control, the skin control of the recommendation skin for the target part is displayed, providing the player with some optional skins that are more suitable for the current scene, avoiding some other unnecessary operations such as level confirmation, identity confirmation, etc., and greatly improving the efficiency of the skin changing. Especially for some players who have difficulty choosing, they can quickly determine a target skin from several recommendation skins for assembly, improving the player's skin-changing efficiency and skin-changing experience.

In an embodiment of the present disclosure, the first response module 1410 is specifically configured to determine current skin theme information of the virtual item; and determine, as the recommendation skin, a part skin whose matching degree with the current skin theme information is greater than a preset matching degree in a part skin library of the target part.

In embodiments of the present disclosure, the current skin theme information of the virtual item is first determined, and then the part skin whose matching degree with the current skin theme information is greater than the preset matching degree in the part skin library of the target part is determined as the recommendation skin, which ensures that the resulting target skin of the target part is as consistent or similar as possible to the current skin style of the virtual item, thereby improving the uniformity and overall aesthetics of the virtual item style.

In an embodiment of the present disclosure, sizes of skin controls of respective recommendation skins are positively related to corresponding matching degrees; and/or, the skin controls of the respective recommendation skins are arranged in order according to magnitudes of the corresponding matching degrees.

The greater the matching degree, the larger the skin control, and the smaller the matching degree, the smaller the skin control, and a skin control with a greater matching degree is ranked higher, and a skin control with a smaller matching degree is ranked lower, so that the player can intuitively determine a recommendation index of each recommendation skin, making it convenient for the player to quickly and easily determine the target skin from the respective recommendation skins.

In an embodiment of the present disclosure, the first response module 1410 is specifically configured to determine an account level of an account to which the virtual item belongs; select, according to the account level, at least one part skin corresponding to the account level from a part skin library of the target part as the first to-be-selected skin; and display the skin control of the first to-be-selected skin.

In embodiments of the present disclosure, the account level of the account to which the virtual item belongs is first determined, and the at least one part skin corresponding to the account level is selected, as the first to-be-selected skin, from the part skin library of the target part according to the account level, so as to display the control. Different levels of users correspond to different levels of part skins, which greatly improve the diversity of part skin changing, and also avoid the need for the player to further perform an operation such as determining his/her own level and character information, etc., thus improving operational efficiency.

In an embodiment of the present disclosure, the first response module 1410 is specifically configured to select, according to the account level, the at least one part skin corresponding to the account level from the part skin library of the target part as an initial first to-be-selected skin; and in response to a first purchase operation for the at least one part skin of several initial first to-be-selected skins, determine a part skin corresponding to the first purchase operation as a target first to-be-selected skin.

In embodiments of the present disclosure, the at least one part skin corresponding to the account level is selected, as the initial first to-be-selected skin, from the part skin library of the target part according to the account level, and then after the first purchase operation of the player for the at least one part skin among the plurality of initial first to-be-selected skins, the part skin corresponding to the first purchase operation is determined as the target first to-be-selected skin, which can improve the interactivity between the merchant and the players.

In an embodiment of the present disclosure, the first response module 1410 is further configured to, in response to a skin acquisition operation for the target part of the plurality of parts, store several skins corresponding to the skin acquisition operation as to-be-selected skins in a part skin library to which the target part belongs.

In embodiments of the present disclosure, for the skin acquisition operation for the target part of the plurality of parts, several skins corresponding to the skin acquisition operation are used as the to-be-selected skins to be stored in the part skin library to which the target part belongs. During the game, the player can acquire the skin the player needs at any time according to a game progress and his/her own preferences, which greatly enhances the player's game participation and experience. In addition, in the embodiments of the present disclosure, the to-be-selected skins acquired by the player through the skin acquisition operation are stored in the part skin library to which the target part belongs, so that the skin can be directly retrieved from the part skin library in a subsequent skin changing as needed, which is convenient and fast, and can greatly improve the efficiency of the part skin changing and the player experience.

In an embodiment of the present disclosure, the first response module 1410 is specifically configured to, in response to the skin-changing touch operation for the target part of the plurality of parts, select from the part skin library several skins corresponding to the target part as the first to-be-selected skins; and display the skin controls of the first to-be-selected skins.

In embodiments of the present disclosure, in response to the skin-changing touch operation for the target part of the plurality of parts, the several skins corresponding to the target part are directly selected from the part skin library as the first to-be-selected skins, thus avoiding a step of acquiring the skin in real time from a service terminal, a user terminal, etc., avoiding wasting the computing resources of the device 1400 for changing the skin of the virtual item, greatly improving the efficiency of determining the first to-be-selected skin, and further improving the player's gaming experience.

In an embodiment of the present disclosure, the first response module 1410 is specifically configured to, in response to a second purchase operation for a skin of the target part of the plurality of parts, store several skins corresponding to the second purchase operation as the to-be-selected skins in the part skin library to which the target part belongs.

In this embodiment of the present disclosure, the skin of the target part is acquired through the second purchase operation, that is, the above-mentioned skin acquisition operation is defined to the second purchase operation in this embodiment of the present disclosure. After the device 1400 for changing the skin of the virtual item displays a plurality of skins of the target part provided by it on the graphical user interface, the player can purchase the skin the player needs through game recharge and other manners, which combines a pure virtual game experience with a real transaction, thereby greatly improving a commercial attribute of the virtual item and the corresponding game. In addition, configuring the second purchase operation to determine the to-be-selected skin can greatly improve the player's purchase rate and game participation.

In an embodiment of the present disclosure, the second response module 1420 is specifically configured to, in response to a third purchase operation for the skin purchase control, determine the first to-be-selected skin corresponding to the third purchase operation as an initial target skin; and in response to the first selection touch operation for a skin control of the target skin of several initial target skins, change the current skin of the target part into the target skin.

In embodiments of the present disclosure, after obtaining the initial target skin based on the third purchase operation in the above step, the device 1400 for changing the skin of the virtual item displays skin controls of a plurality of initial target skins, and then the player selects the skin the player wants to use as the target skin through the first selection touch operation such as clicking, double-clicking, long pressing, and sliding, and changes the current skin of the target part into the target skin to complete the skin changing operation for the target part.

In an embodiment of the present disclosure, the first response module 1410 is specifically configured to, in response to the second skin-changing touch operation for the target part of the respective first skin-changing controls, display, in a first display area of a current display interface, the skin controls of the several first to-be-selected skins corresponding to the target part; and display, in a second display area of the current display interface, a second skin-changing control corresponding to a changeable part, wherein a changeable part list includes second skin-changing controls corresponding to a plurality of changeable parts, and the changeable part is a part that is available for being changed at an installation position of the target part in the virtual item.

In embodiments of the present disclosure, the skin controls of the plurality of first to-be-selected skins corresponding to the target part are displayed in the first display area of the current display interface, and the second skin-changing control corresponding to the changeable part is simultaneously displayed in the second display area, which is convenient to perform the skin changing for the part while changing the part at that position, and perform the skin changing on the replaced part, greatly facilitating the player's operation and improving the player's gaming experience.

In an embodiment of the present disclosure, the first response module 1410 is further configured to, in response to a third selection touch operation for a target changing part of a plurality of second skin-changing controls, display a second to-be-selected skin corresponding to the target changing part.

In embodiments of the present disclosure, the plurality of second skin-changing controls are displayed in the form of a list in the second display area. If the player needs to change the part, the player only needs to select the target changing part that needs to be changed through the third selection operation such as clicking, double-clicking, long pressing, sliding, etc., and then the device 1400 for changing the skin of the virtual item will display the second to-be-selected skins corresponding to the target changing part for the player to select, which can greatly improve the diversity of the skin changing, the efficiency of the part changing and the richness of the player operation.

In an embodiment of the present disclosure, the second response module 1420 is further configured to, in response to an overall skin-changing operation for the virtual item, display skin controls of several item skins corresponding to the virtual item; and in response to a third selection touch operation for a target item skin of the skin controls of the several item skins, change a current overall item skin of the virtual item into the target item skin.

In embodiments of the present disclosure, when the player needs to perform the overall skin changing for the virtual item, the player only needs to perform the overall skin changing operation to trigger the display of the skin controls of the several item skins for the player to select, and the player can change the current overall item skin of the virtual item into the target item skin through the third selection touch operation for the target item skin of the several item skins, which is convenient and quick, and greatly improves the efficiency of the virtual item skin changing.

Embodiments of the present disclosure further provide a computer-readable storage medium, which may be implemented in the form of a program product including program codes, and when the program product runs on an electronic device, the program codes are configured to cause the electronic device to perform steps according to various embodiments of the present disclosure described in the "example methods" section of the present specification. In an embodiment, the program product may be implemented as a portable Compact Disc Read-Only Memory (CD-ROM) and include program codes, and may be run on an electronic device, such as a personal computer. However, the program product of the present disclosure is not limited thereto. The readable storage medium herein may be any tangible medium containing or storing a program, and the program may be used by an instruction execution system, apparatus, or device, or the program may be used in combination with the instruction execution system, apparatus, or device.

The program product may take the form of any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (a non-exhaustive list) of readable storage media include: electrical connection with one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The computer-readable signal medium may include a data signal propagated in a baseband or as part of a carrier wave, which carries readable program codes. Such a propagated data signal may have various forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with the instruction execution system, apparatus, or device.

The program codes embodied on the readable medium may be transmitted using any appropriate medium, including but not limited to a wireless or wired medium, an optical fiber, RF, or any suitable combination of the foregoing.

The program codes used for performing the operations of the present disclosure may be written in any combination of one or more programming languages, including object-oriented programming languages, such as Java and C++, and conventional procedural programming language, such as "C" or a similar programming language. The program codes may be executed entirely on the user computing device, may be executed partly on the user device, may be executed as an independent software package, may be executed partly on the user computing device and partly on a remote computing device, or may be executed entirely on the remote computing device or server. In the case of a remote computing device, the remote computing device may be connected to the user computing device through any kind of network, including a local area network (LAN) or a wide area network (WAN), or the remote computing device may be connected to an external computing device, for example, by the Internet provided by the Internet service providers. In embodiments of the present disclosure, the program codes stored in the computer-readable storage medium, when executed, can implement any step in the above method for changing the skin of virtual item In an embodiment of the present disclosure, the program codes stored in the computer-readable storage medium, when executed, can implement the following steps:

in response to a skin-changing touch operation for a target part of the plurality of parts, displaying skin controls of several first to-be-selected skins corresponding to the target part; and in response to a first selection touch operation for a target skin of the skin controls, changing a current skin of the target part into the target skin.

When the computer-readable storage medium is executed, in response to the skin-changing touch operation by the player for the target part of the plurality of parts, the skin controls of the plurality of first to-be-selected skins corresponding to the target part are displayed for the further selection by the player, and in response to the first selection touch operation for the target skin of the skin controls, the current skin of the target part is changed into the target skin. In the embodiments of the present disclosure, the skin changing is performed for the part in the virtual item, which facilitates the player to freely assemble the skin according to his/her own preferences without the need to replace the entire skin in a conventional manner, solves the technical problem that the existing method for changing the skin of the virtual item is relatively simple, and achieves the technical effect of improving the flexibility and the combination richness of the skin changing of the virtual item.

In an embodiment of the present disclosure, the program codes stored in the computer-readable storage medium, when executed, further implement the following steps: in response to a first skin-changing touch operation for the virtual item, display respective first skin-changing controls respectively corresponding to the plurality of parts in the virtual item; and in response to a second skin-changing touch operation for the target part of the respective first skin-changing controls, display the skin controls of the several first to-be-selected skins corresponding to the target part.

In embodiments of the present disclosure, the first skin-changing controls respectively corresponding to the respective parts in the virtual item are first displayed according to the first skin-changing touch operation of the player for the player to select the target part whose skin needs to be changed, and then according to the second skin-changing touch operation for the target part by the player, the skin controls of the first to-be-selected skins corresponding to the target part are displayed for the player to select the skin. The player has high selectivity, the flexibility of the skin changing can be greatly improved, the richness and diversity of the skin combinations of the virtual item are improved, and the player's skin-changing experience can also greatly improved.

In an embodiment of the present disclosure, the program codes stored in the computer-readable storage medium, when executed, further implement the following steps: in response to the first skin-changing touch operation for the virtual item, jumping a current display interface to a modification interface of the virtual item; and displaying, in the modification interface, the respective first skin-changing controls respectively corresponding to the plurality of parts.

In embodiments of the present disclosure, in response to the first skin-changing touch operation, the modification interface is first jumped to, where the virtual item is displayed in the enlarged and highlighted manner, so that the player can intuitively see the overall structure and the positions of the individual parts of the virtual item, and then more intuitively determine the target part that needs the skin changing operation, improving the convenience of the player's operation, and thus improving the player's user experience.

In an embodiment of the present disclosure, the program codes stored in the computer-readable storage medium, when executed, further implement the following steps: displaying a guide component configured to indicate a correspondence between respective parts in the virtual item and the respective first skin-changing controls.

In embodiments of the present disclosure, the corresponding guide component is configured for each first skin-changing control, which facilitates the player to clearly determine the part corresponding to each first skin-changing control, as well as the position of the part, so as to facilitate the player to quickly select, through the corresponding first skin-changing control, the target part that needs the skin changing, avoid mistakenly operating another part due to some parts being too small, and greatly improve the convenience and accuracy of the player's operation.

In an embodiment of the present disclosure, the program codes stored in the computer-readable storage medium, when executed, further implement the following steps: in response to a second selection touch operation for a skin recommendation control, displaying a skin control of a recommendation skin of the target part.

In embodiments of the present disclosure, in response to the second selection touch operation for the skin recommendation control, the skin control of the recommendation skin for the target part is displayed, providing the player with some optional skins that are more suitable for the current scene, avoiding some other unnecessary operations such as level confirmation, identity confirmation, etc., and greatly improving the efficiency of the skin changing. Especially for some players who have difficulty choosing, they can quickly determine a target skin from several recommendation skins for assembly, improving the player's skin-changing efficiency and skin-changing experience.

In an embodiment of the present disclosure the program codes stored in the computer-readable storage medium, when executed, further implement the following steps: determining current skin theme information of the virtual item; and determining, as the recommendation skin, a part skin whose matching degree with the current skin theme information is greater than a preset matching degree in a part skin library of the target part.

In embodiments of the present disclosure, the current skin theme information of the virtual item is first determined, and then the part skin whose matching degree with the current skin theme information is greater than the preset matching degree in the part skin library of the target part is determined as the recommendation skin, which ensures that the resulting target skin of the target part is as consistent or similar as possible to the current skin style of the virtual item, thereby improving the uniformity and overall aesthetics of the virtual item style.

In an embodiment of the present disclosure, sizes of skin controls of respective recommendation skins are positively related to corresponding matching degrees; and/or, the skin controls of the respective recommendation skins are arranged in order according to magnitudes of the corresponding matching degrees.

The greater the matching degree, the larger the skin control, and the smaller the matching degree, the smaller the skin control, and a skin control with a greater matching degree is ranked higher, and a skin control with a smaller matching degree is ranked lower, so that the player can intuitively determine a recommendation index of each recommendation skin, making it convenient for the player to quickly and easily determine the target skin from the respective recommendation skins.

In an embodiment of the present disclosure, the program codes stored in the computer-readable storage medium, when executed, further implement the following steps: determining an account level of an account to which the virtual item belongs; selecting, according to the account level, at least one part skin corresponding to the account level from a part skin library of the target part as the first to-be-selected skin; and displaying the skin control of the first to-be-selected skin.

In embodiments of the present disclosure, the account level of the account to which the virtual item belongs is first determined, and the at least one part skin corresponding to the account level is selected, as the first to-be-selected skin, from the part skin library of the target part according to the account level, so as to display the control. Different levels of users correspond to different levels of part skins, which greatly improve the diversity of part skin changing, and also avoid the need for the player to further perform an operation such as determining his/her own level and character information, etc., thus improving operational efficiency.

In an embodiment of the present disclosure, the program codes stored in the computer-readable storage medium, when executed, further implement the following steps: selecting, according to the account level, the at least one part skin corresponding to the account level from the part skin library of the target part as an initial first to-be-selected skin; and in response to a first purchase operation for the at least one part skin of several initial first to-be-selected skins, determining a part skin corresponding to the first purchase operation as a target first to-be-selected skin.

In embodiments of the present disclosure, the at least one part skin corresponding to the account level is selected, as the initial first to-be-selected skin, from the part skin library of the target part according to the account level, and then after the first purchase operation of the player for the at least one part skin among the plurality of initial first to-be-selected skins, the part skin corresponding to the first purchase operation is determined as the target first to-be-selected skin, which can improve the interactivity between the merchant and the players.

In an embodiment of the present disclosure the program codes stored in the computer-readable storage medium, when executed, further implement the following steps: in response to a skin acquisition operation for the target part of the plurality of parts, storing several skins corresponding to the skin acquisition operation as to-be-selected skins in a part skin library to which the target part belongs.

In embodiments of the present disclosure, for the skin acquisition operation for the target part of the plurality of parts, several skins corresponding to the skin acquisition operation are used as the to-be-selected skins to be stored in the part skin library to which the target part belongs. During the game, the player can acquire the skin the player needs at any time according to a game progress and his/her own preferences, which greatly enhances the player's game participation and experience. In addition, in the embodiments of the present disclosure, the to-be-selected skins acquired by the player through the skin acquisition operation are stored in the part skin library to which the target part belongs, so that the skin can be directly retrieved from the part skin library in a subsequent skin changing as needed, which is convenient and fast, and can greatly improve the efficiency of the part skin changing and the player experience.

In an embodiment of the present disclosure, the program codes stored in the computer-readable storage medium, when executed, further implement the following steps: in response to the skin-changing touch operation for the target part of the plurality of parts, selecting from the part skin library several skins corresponding to the target part as the first to-be-selected skins; and displaying the skin controls of the first to-be-selected skins.

In embodiments of the present disclosure, in response to the skin-changing touch operation for the target part of the plurality of parts, the several skins corresponding to the target part are directly selected from the part skin library as the first to-be-selected skins, thus avoiding a step of acquiring the skin in real time from a service terminal, a user terminal, etc., avoiding wasting the computing resources of the computer-readable storage medium, greatly improving the efficiency of determining the first to-be-selected skin, and further improving the player's gaming experience.

In an embodiment of the present disclosure, the program codes stored in the computer-readable storage medium, when executed, further implement the following steps: in response to a second purchase operation for a skin of the target part of the plurality of parts, store several skins corresponding to the second purchase operation as the to-be-selected skins in the part skin library to which the target part belongs.

In this embodiment of the present disclosure, the skin of the target part is acquired through the second purchase operation, that is, the above-mentioned skin acquisition operation is defined to the second purchase operation in this embodiment of the present disclosure. After the computer-readable storage medium displays a plurality of skins of the target part provided by it on the graphical user interface, the player can purchase the skin the player needs through game recharge and other manners, which combines a pure virtual game experience with a real transaction, thereby greatly improving a commercial attribute of the virtual item and the corresponding game. In addition, configuring the second purchase operation to determine the to-be-selected skin can greatly improve the player's purchase rate and game participation.

In an embodiment of the present disclosure, the program codes stored in the computer-readable storage medium, when executed, further implement the following steps: in response to a third purchase operation for the skin purchase control, determining the first to-be-selected skin corresponding to the third purchase operation as an initial target skin; and in response to the first selection touch operation for a skin control of the target skin of several initial target skins, changing the current skin of the target part into the target skin.

In embodiments of the present disclosure, after obtaining the initial target skin based on the third purchase operation in the above step, the computer-readable storage medium displays skin controls of a plurality of initial target skins, and then the player selects the skin the player wants to use as the target skin through the first selection touch operation such as clicking, double-clicking, long pressing, and sliding, and changes the current skin of the target part into the target skin to complete the skin changing operation for the target part.

In an embodiment of the present disclosure, the program codes stored in the computer-readable storage medium, when executed, further implement the following steps: in response to the second skin-changing touch operation for the target part of the respective first skin-changing controls, displaying, in a first display area of a current display interface, the skin controls of the several first to-be-selected skins corresponding to the target part; and displaying, in a second display area of the current display interface, a second skin-changing control corresponding to a changeable part, wherein a changeable part list includes second skin-changing controls corresponding to a plurality of changeable parts, and the changeable part is a part that is available for being changed at an installation position of the target part in the virtual item.

In embodiments of the present disclosure, the skin controls of the plurality of first to-be-selected skins corresponding to the target part are displayed in the first display area of the current display interface, and the second skin-changing control corresponding to the changeable part is simultaneously displayed in the second display area, which is convenient to perform the skin changing for the part while changing the part at that position, and perform the skin changing on the replaced part, greatly facilitating the player's operation and improving the player's gaming experience.

In an embodiment of the present disclosure, the program codes stored in the computer-readable storage medium, when executed, further implement the following steps: in response to a third selection touch operation for a target changing part of a plurality of second skin-changing controls, displaying a second to-be-selected skin corresponding to the target changing part.

In embodiments of the present disclosure, the plurality of second skin-changing controls are displayed in the form of a list in the second display area. If the player needs to change the part, the player only needs to select the target changing part that needs to be changed through the third selection operation such as clicking, double-clicking, long pressing, sliding, etc., and then the computer-readable storage medium will display the second to-be-selected skins corresponding to the target changing part for the player to select, which can greatly improve the diversity of the skin changing, the efficiency of the part changing and the richness of the player operation.

In an embodiment of the present disclosure the program codes stored in the computer-readable storage medium, when executed, further implement the following steps: in response to an overall skin-changing operation for the virtual item, displaying skin controls of several item skins corresponding to the virtual item; and in response to a third selection touch operation for a target item skin of the skin controls of the several item skins, changing a current overall item skin of the virtual item into the target item skin.

In embodiments of the present disclosure, when the player needs to perform the overall skin changing for the virtual item, the player only needs to perform the overall skin changing operation to trigger the display of the skin controls of the several item skins for the player to select, and the player can change the current overall item skin of the virtual item into the target item skin through the third selection touch operation for the target item skin of the several item skins, which is convenient and quick, and greatly improves the efficiency of the virtual item skin changing.

Figure 15:
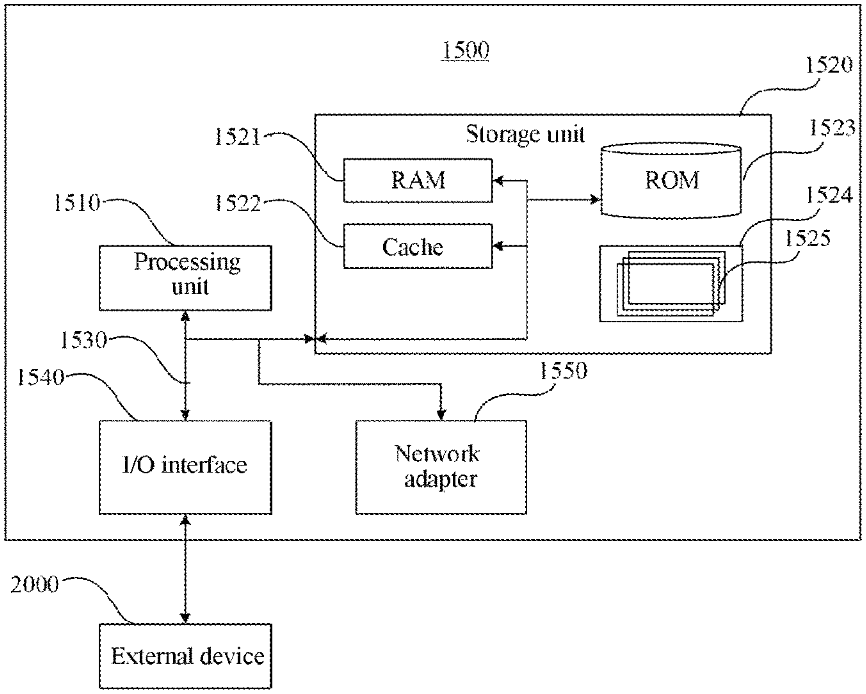
FIG. 15 shows a schematic structural diagram of an electronic device according to an embodiment of the present disclosure.

Referring to FIG. 15, embodiments of the present disclosure further provide an electronic device 1500, which may be a backend server of an information platform The electronic device 1500 will be described below with reference to FIG. 15. It should be understood that the electronic device 1500 shown in FIG. 15 is only an example and should not bring any limitations to the functions and scope of use of embodiments of the present disclosure.

As shown in FIG. 15, the electronic device 1500 takes the form of a general-purpose computing device. Components of the electronic device 1500 may include, but are not limited to: at least one processing unit 1510, at least one storage unit 1520, and a bus 1530 connecting different system components (including the storage unit 1520 and the processing unit 1510).

The storage unit stores program codes which can be executed by the processing unit 1510 to cause the processing unit 1510 to perform the steps according to various embodiments of the present disclosure described in the "example methods" section of the present specification. For example, the processing unit 1510 may perform the method steps shown in FIG. 2 and the like.

The storage unit 1520 may include a volatile storage unit, such as a random access storage unit (RAM) 1521 and/or a cache storage unit 1522, and may further include a read-only storage unit (ROM) 1523.

The storage unit 1520 may further include a program/utility tool 1524 having a set (at least one) of program modules 1525. Such program modules 1525 include, but are not limited to, an operating system, one or more application programs, other program modules, and program data. Each or some combination of these examples may include an implementation of a network environment.

The bus 1530 may include a data bus, an address bus, and a control bus.

The electronic device 1500 may also communicate with one or more external devices 2000 (such as a keyboard, a pointing device, a Bluetooth device, etc.), and such communication may be performed through an input/output (I/O) interface 1540. Moreover, the electronic device 1500 may also communicate with one or more networks (such as a local area network (LAN), a wide area network (WAN), and/or a public network, such as the Internet) through the network adapter 1550. As shown in the figure, the network adapter 1550 communicates with other modules of the electronic device 1500 through the bus 1530. It should be understood that although not shown in the figure, other hardware and/or software modules may be used in conjunction with the electronic device 1500, including but not limited to: microcode, device drivers, redundant processing units, external disk drive arrays, RAID systems, tape drives and data backup storage systems.

In embodiments of the present disclosure, the program codes stored in the electronic device, when executed, can implement any step in the above method for changing the skin of the virtual item.

In an embodiment of the present disclosure, the program codes stored in the electronic device, when executed, can implement the following steps:

in response to a skin-changing touch operation for a target part of the plurality of parts, displaying skin controls of several first to-be-selected skins corresponding to the target part; and in response to a first selection touch operation for a target skin of the skin controls, changing a current skin of the target part into the target skin.

When the electronic device is executed, in response to the skin-changing touch operation by the player for the target part of the plurality of parts, the skin controls of the plurality of first to-be-selected skins corresponding to the target part are displayed for the further selection by the player, and in response to the first selection touch operation for the target skin of the skin controls, the current skin of the target part is changed into the target skin. In the embodiments of the present disclosure, the skin changing is performed for the part in the virtual item, which facilitates the player to freely assemble the skin according to his/her own preferences without the need to replace the entire skin in a conventional manner, solves the technical problem that the existing method for changing the skin of the virtual item is relatively simple, and achieves the technical effect of improving the flexibility and the combination richness of the skin changing of the virtual item.

In an embodiment of the present disclosure, the program codes stored in the electronic device, when executed, further implement the following steps: in response to a first skin-changing touch operation for the virtual item, display respective first skin-changing controls respectively corresponding to the plurality of parts in the virtual item; and in response to a second skin-changing touch operation for the target part of the respective first skin-changing controls, display the skin controls of the several first to-be-selected skins corresponding to the target part.

In embodiments of the present disclosure, the first skin-changing controls respectively corresponding to the respective parts in the virtual item are first displayed according to the first skin-changing touch operation of the player for the player to select the target part whose skin needs to be changed, and then according to the second skin-changing touch operation for the target part by the player, the skin controls of the first to-be-selected skins corresponding to the target part are displayed for the player to select the skin. The player has high selectivity; the flexibility of the skin changing can be greatly improved, the richness and diversity of the skin combinations of the virtual item are improved, and the player's skin-changing experience can also greatly improved.

In an embodiment of the present disclosure, the program codes stored in the electronic device, when executed, further implement the following steps: in response to the first skin-changing touch operation for the virtual item, jumping a current display interface to a modification interface of the virtual item; and displaying, in the modification interface, the respective first skin-changing controls respectively corresponding to the plurality of parts.

In embodiments of the present disclosure, in response to the first skin-changing touch operation, the modification interface is first jumped to, where the virtual item is displayed in the enlarged and highlighted manner, so that the player can intuitively see the overall structure and the positions of the individual parts of the virtual item, and then more intuitively determine the target part that needs the skin changing operation, improving the convenience of the player's operation, and thus improving the player's user experience.

In an embodiment of the present disclosure, the program codes stored in the electronic device, when executed, further implement the following steps: displaying a guide component configured to indicate a correspondence between respective parts in the virtual item and the respective first skin-changing controls.

In embodiments of the present disclosure, the corresponding guide component is configured for each first skin-changing control, which facilitates the player to clearly determine the part corresponding to each first skin-changing control, as well as the position of the part, so as to facilitate the player to quickly select, through the corresponding first skin-changing control, the target part that needs the skin changing, avoid mistakenly operating another part due to some parts being too small, and greatly improve the convenience and accuracy of the player's operation.

In an embodiment of the present disclosure, the program codes stored in the electronic device, when executed, further implement the following steps: in response to a second selection touch operation for a skin recommendation control, displaying a skin control of a recommendation skin of the target part.

In embodiments of the present disclosure, in response to the second selection touch operation for the skin recommendation control, the skin control of the recommendation skin for the target part is displayed, providing the player with some optional skins that are more suitable for the current scene, avoiding some other unnecessary operations such as level confirmation, identity confirmation, etc., and greatly improving the efficiency of the skin changing. Especially for some players who have difficulty choosing, they can quickly determine a target skin from several recommendation skins for assembly, improving the player's skin-changing efficiency and skin-changing experience.

In an embodiment of the present disclosure the program codes stored in the electronic device, when executed, further implement the following steps: determining current skin theme information of the virtual item; and determining, as the recommendation skin, a part skin whose matching degree with the current skin theme information is greater than a preset matching degree in a part skin library of the target part.

In embodiments of the present disclosure, the current skin theme information of the virtual item is first determined, and then the part skin whose matching degree with the current skin theme information is greater than the preset matching degree in the part skin library of the target part is determined as the recommendation skin, which ensures that the resulting target skin of the target part is as consistent or similar as possible to the current skin style of the virtual item, thereby improving the uniformity and overall aesthetics of the virtual item style.

In an embodiment of the present disclosure, sizes of skin controls of respective recommendation skins are positively related to corresponding matching degrees; and/or, the skin controls of the respective recommendation skins are arranged in order according to magnitudes of the corresponding matching degrees.

The greater the matching degree, the larger the skin control, and the smaller the matching degree, the smaller the skin control, and a skin control with a greater matching degree is ranked higher, and a skin control with a smaller matching degree is ranked lower, so that the player can intuitively determine a recommendation index of each recommendation skin, making it convenient for the player to quickly and easily determine the target skin from the respective recommendation skins.

In an embodiment of the present disclosure, the program codes stored in the electronic device, when executed, further implement the following steps: determining an account level of an account to which the virtual item belongs; selecting, according to the account level, at least one part skin corresponding to the account level from a part skin library of the target part as the first to-be-selected skin; and displaying the skin control of the first to-be-selected skin.

In embodiments of the present disclosure, the account level of the account to which the virtual item belongs is first determined, and the at least one part skin corresponding to the account level is selected, as the first to-be-selected skin, from the part skin library of the target part according to the account level, so as to display the control. Different levels of users correspond to different levels of part skins, which greatly improve the diversity of part skin changing, and also avoid the need for the player to further perform an operation such as determining his/her own level and character information, etc., thus improving operational efficiency.

In an embodiment of the present disclosure, the program codes stored in the electronic device, when executed, further implement the following steps: selecting, according to the account level, the at least one part skin corresponding to the account level from the part skin library of the target part as an initial first to-be-selected skin; and in response to a first purchase operation for the at least one part skin of several initial first to-be-selected skins, determining a part skin corresponding to the first purchase operation as a target first to-be-selected skin.

In embodiments of the present disclosure, the at least one part skin corresponding to the account level is selected, as the initial first to-be-selected skin, from the part skin library of the target part according to the account level, and then after the first purchase operation of the player for the at least one part skin among the plurality of initial first to-be-selected skins, the part skin corresponding to the first purchase operation is determined as the target first to-be-selected skin, which can improve the interactivity between the merchant and the players.

In an embodiment of the present disclosure the program codes stored in the electronic device, when executed, further implement the following steps: in response to a skin acquisition operation for the target part of the plurality of parts, storing several skins corresponding to the skin acquisition operation as to-be-selected skins in a part skin library to which the target part belongs.

In embodiments of the present disclosure, for the skin acquisition operation for the target part of the plurality of parts, several skins corresponding to the skin acquisition operation are used as the to-be-selected skins to be stored in the part skin library to which the target part belongs. During the game, the player can acquire the skin the player needs at any time according to a game progress and his/her own preferences, which greatly enhances the player's game participation and experience. In addition, in the embodiments of the present disclosure, the to-be-selected skins acquired by the player through the skin acquisition operation are stored in the part skin library to which the target part belongs, so that the skin can be directly retrieved from the part skin library in a subsequent skin changing as needed, which is convenient and fast, and can greatly improve the efficiency of the part skin changing and the player experience.

In an embodiment of the present disclosure, the program codes stored in the electronic device, when executed, further implement the following steps: in response to the skin-changing touch operation for the target part of the plurality of parts, selecting from the part skin library several skins corresponding to the target part as the first to-be-selected skins; and displaying the skin controls of the first to-be-selected skins.

In embodiments of the present disclosure, in response to the skin-changing touch operation for the target part of the plurality of parts, the several skins corresponding to the target part are directly selected from the part skin library as the first to-be-selected skins, thus avoiding a step of acquiring the skin in real time from a service terminal, a user terminal, etc., avoiding wasting the computing resources of the electronic device, greatly improving the efficiency of determining the first to-be-selected skin, and further improving the player's gaming experience.

In an embodiment of the present disclosure, the program codes stored in the electronic device, when executed, further implement the following steps: in response to a second purchase operation for a skin of the target part of the plurality of parts, store several skins corresponding to the second purchase operation as the to-be-selected skins in the part skin library to which the target part belongs.

In this embodiment of the present disclosure, the skin of the target part is acquired through the second purchase operation, that is, the above-mentioned skin acquisition operation is defined to the second purchase operation in this embodiment of the present disclosure. After the electronic device displays a plurality of skins of the target part provided by it on the graphical user interface, the player can purchase the skin the player needs through game recharge and other manners, which combines a pure virtual game experience with a real transaction, thereby greatly improving a commercial attribute of the virtual item and the corresponding game. In addition, configuring the second purchase operation to determine the to-be-selected skin can greatly improve the player's purchase rate and game participation.

In an embodiment of the present disclosure, the program codes stored in the electronic device, when executed, further implement the following steps: in response to a third purchase operation for the skin purchase control, determining the first to-be-selected skin corresponding to the third purchase operation as an initial target skin; and in response to the first selection touch operation for a skin control of the target skin of several initial target skins, changing the current skin of the target part into the target skin.

In embodiments of the present disclosure, after obtaining the initial target skin based on the third purchase operation in the above step, the electronic device displays skin controls of a plurality of initial target skins, and then the player selects the skin the player wants to use as the target skin through the first selection touch operation such as clicking, double-clicking, long pressing, and sliding, and changes the current skin of the target part into the target skin to complete the skin changing operation for the target part.

In an embodiment of the present disclosure, the program codes stored in the electronic device, when executed, further implement the following steps: in response to the second skin-changing touch operation for the target part of the respective first skin-changing controls, displaying, in a first display area of a current display interface, the skin controls of the several first to-be-selected skins corresponding to the target part; and displaying, in a second display area of the current display interface, a second skin-changing control corresponding to a changeable part, wherein a changeable part list includes second skin-changing controls corresponding to a plurality of changeable parts, and the changeable part is a part that is available for being changed at an installation position of the target part in the virtual item.

In embodiments of the present disclosure, the skin controls of the plurality of first to-be-selected skins corresponding to the target part are displayed in the first display area of the current display interface, and the second skin-changing control corresponding to the changeable part is simultaneously displayed in the second display area, which is convenient to perform the skin changing for the part while changing the part at that position, and perform the skin changing on the replaced part, greatly facilitating the player's operation and improving the player's gaming experience.

In an embodiment of the present disclosure, the program codes stored in the electronic device, when executed, further implement the following steps: in response to a third selection touch operation for a target changing part of a plurality of second skin-changing controls, displaying a second to-be-selected skin corresponding to the target changing part.

In embodiments of the present disclosure, the plurality of second skin-changing controls are displayed in the form of a list in the second display area. If the player needs to change the part, the player only needs to select the target changing part that needs to be changed through the third selection operation such as clicking, double-clicking, long pressing, sliding, etc., and then the electronic device will display the second to-be-selected skins corresponding to the target changing part for the player to select, which can greatly improve the diversity of the skin changing, the efficiency of the part changing and the richness of the player operation.

In an embodiment of the present disclosure the program codes stored in the electronic device, when executed, further implement the following steps: in response to an overall skin-changing operation for the virtual item, displaying skin controls of several item skins corresponding to the virtual item; and in response to a third selection touch operation for a target item skin of the skin controls of the several item skins, changing a current overall item skin of the virtual item into the target item skin.

In embodiments of the present disclosure, when the player needs to perform the overall skin changing for the virtual item, the player only needs to perform the overall skin changing operation to trigger the display of the skin controls of the several item skins for the player to select, and the player can change the current overall item skin of the virtual item into the target item skin through the third selection touch operation for the target item skin of the several item skins, which is convenient and quick, and greatly improves the efficiency of the virtual item skin changing.

It should be noted that although several modules or units of the devices for performing actions are mentioned in the above detailed description, such division of modules or units is not mandatory. In fact, features and functions of two or more of the modules or units described above may be embodied in one module or unit in accordance with embodiments of the present disclosure. Conversely, the features and functions of one module or unit described above may be further divided to be embodied by multiple modules or units.

Those skilled in the art can understand that various aspects of the present disclosure may be implemented as a system, a method, or a program product. Therefore, various aspects of the present disclosure can be embodied in the following forms: a complete hardware implementation, a complete software implementation (including firmware, microcode, etc.), or a combination of hardware and software implementations, which can be collectively referred to as "circuit", "module', or "system". Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structure that has been described above and shown in the drawings, and various modifications and changes may be made without departing from the scope of the present disclosure. The scope of the disclosure is only defined by the appended claims.

What is claimed is:

1. A method for changing a skin of a virtual item, comprising:

in response to a first skin-changing touch operation for a virtual item, displaying respective first skin-changing controls corresponding to a plurality of parts in the virtual item, wherein the virtual item comprises the plurality of parts and a target part is one of the plurality of parts, a graphical user interface is provided by a terminal device, and content displayed by the graphical user interface comprises the virtual item;

in response to a second skin-changing touch operation for a target first skin-changing control of the target part in the respective first skin-changing controls, determining current skin theme information of the virtual item, wherein the skin theme information comprises at least one of color, a pattern or a picture;

determining, as a recommendation skin, a part skin whose matching degree with the current skin theme information is greater than a preset matching degree in a part skin library of the target part, wherein the matching degree is calculated based on at least one of pixel value comparison, pattern texture comparison, or image feature similarity calculation;

displaying a skin control of the recommendation skin of the target part, wherein sizes of skin controls of respective recommendation skins are positively related to corresponding matching degrees; or, the skin controls of the respective recommendation skins are arranged in order according to magnitudes of the corresponding matching degrees; and in response to a first selection touch operation for the skin control of the recommendation skin, changing a current skin of the target part into the recommendation skin.

2. The method according to claim 1, wherein in response to the first skin-changing touch operation for the virtual item, displaying the respective first skin-changing controls corresponding to the plurality of parts in the virtual item comprises:

in response to the first skin-changing touch operation for the virtual item, jumping a current display interface to a modification interface of the virtual item; and displaying, in the modification interface, the respective first skin-changing controls corresponding to the plurality of parts.

3. The method according to claim 1, wherein the method further comprises:

displaying a guide component configured to indicate a correspondence between a part in the virtual item and a first skin-changing control.

4. The method according to claim 1, wherein the method further comprises:

in response to a skin acquisition operation for the target part of the plurality of parts, storing a skin corresponding to the skin acquisition operation as a to-be-selected skin in a part skin library to which the target part belongs.

5. The method according to claim 4, wherein in response to the skin-changing touch operation for the target part of the plurality of parts, displaying the skin control of the first to-be-selected skin corresponding to the target part comprises:

in response to the skin-changing touch operation for the target part of the plurality of parts, selecting from the part skin library a skin corresponding to the target part as the first to-be-selected skin; and displaying the skin control of the first to-be-selected skin.

6. The method according to claim 4, wherein in response to the skin acquisition operation for the target part of the plurality of parts, storing the skin corresponding to the skin acquisition operation as the to-be-selected skin in the part skin library to which the target part belongs comprises:

in response to a second purchase operation for a skin of the target part of the plurality of parts, storing the skin corresponding to the second purchase operation as the to-be-selected skin in the part skin library to which the target part belongs.

7. The method according to claim 1, wherein the method further comprises:

in response to an overall skin-changing operation for the virtual item, displaying an item skin control of an item skin corresponding to the virtual item; and in response to a fourth selection touch operation for a target item skin control of a target item skin in the item skin control of the item skin, changing a current overall item skin of the virtual item into the target item skin.

8. A non-transitory computer-readable storage medium having a computer program stored thereon which, when executed by a processor, implements:

in response to a first skin-changing touch operation for a virtual item, displaying respective first skin-changing controls corresponding to a plurality of parts in the virtual item, displaying a skin control of a first to be-selected skin corresponding to the target part, wherein the virtual item comprises the plurality of parts and a target part is one of the plurality of parts, a graphical user interface is provided by a terminal device, and content displayed by the graphical user interface comprises the virtual item;

in response to a second skin-changing touch operation for a target first skin-changing control of the target part in the respective first skin-changing controls, determining current skin theme information of the virtual item, wherein the skin theme information comprises at least one of color, a pattern or a picture;

determining, as a recommendation skin, a part skin whose matching degree with the current skin theme information is greater than a preset matching degree in a part skin library of the target part, wherein the matching degree is calculated based on at least one of pixel value comparison, pattern texture comparison, or image feature similarity calculation;

displaying a skin control of the recommendation skin of the target part, wherein sizes of skin controls of respective recommendation skins are positively related to corresponding matching degrees; or, the skin controls of the respective recommendation skins are arranged in order according to magnitudes of the corresponding matching degrees; and in response to a first selection touch operation for the skin control of the recommendation skin, changing a current skin of the target part into the recommendation skin.

9. An electronic device, comprising:

a processor; and a memory, configured to store executable instructions of the processor;

wherein the processor is configured to:

in response to a first skin-changing touch operation for a virtual item, display respective first skin-changing controls corresponding to a plurality of parts in the virtual item, wherein the virtual item comprises the plurality of parts and a target part is one of the plurality of parts, a graphical user interface is provided by a terminal device, and content displayed by the graphical user interface comprises the virtual item;

in response to a second skin-changing touch operation for a target first skin-changing control of the target part in the respective first skin-changing controls, determine current skin theme information of the virtual item, wherein the skin theme information comprises at least one of color, a pattern or a picture;

determine, as a recommendation skin, a part skin whose matching degree with the current skin theme information is greater than a preset matching degree in a part skin library of the target part, wherein the matching degree is calculated based on at least one of pixel value comparison, pattern texture comparison, or image feature similarity calculation;

display a skin control of the recommendation skin of the target part, wherein sizes of skin controls of respective recommendation skins are positively related to corresponding matching degrees; or, the skin controls of the respective recommendation skins are arranged in order according to magnitudes of the corresponding matching degrees; and in response to a first selection touch operation for the skin control of the recommendation skin, change a current skin of the target part into the recommendation skin.

* * * * *